United States Patent
Xiong et al.

(10) Patent No.: US 9,887,822 B2
(45) Date of Patent: Feb. 6, 2018

(54) SYSTEM AND METHOD TO ADDRESS RESOURCE COLLISION FOR ASYMMETRIC REGION ALLOCATION

(71) Applicant: Intel IP Corporation, Santa Clara, CA (US)

(72) Inventors: Gang Xiong, Beaverton, OR (US); Debdeep Chatterjee, Mountain View, CA (US); Seunghee Han, Cupertino, CA (US); Jong-kae Fwu, Sunnyvale, CA (US)

(73) Assignee: Intel IP Corporation, Santa Clara, CA (US)

(*) Notice: Subject to any disclaimer, the term of this patent is extended or adjusted under 35 U.S.C. 154(b) by 97 days.

(21) Appl. No.: 14/692,510

(22) Filed: Apr. 21, 2015

(65) Prior Publication Data
US 2016/0128055 A1 May 5, 2016

Related U.S. Application Data

(60) Provisional application No. 62/074,296, filed on Nov. 3, 2014.

(51) Int. Cl.
*H04L 5/00* (2006.01)
*H04W 4/00* (2009.01)
(Continued)

(52) U.S. Cl.
CPC .......... *H04L 5/0055* (2013.01); *H04L 1/1812* (2013.01); *H04L 1/1854* (2013.01);
(Continued)

(58) Field of Classification Search
CPC .............. H04W 72/048; H04W 4/005; H04W 72/0446; H04W 72/0453; H04W 72/046;
(Continued)

(56) References Cited

U.S. PATENT DOCUMENTS

2009/0181689 A1* 7/2009 Lee ................... H04L 1/1854
455/450
2009/0274077 A1* 11/2009 Meylan ............... H04W 28/06
370/280
(Continued)

FOREIGN PATENT DOCUMENTS

KR 20170013316 A 2/2017
WO 2013049768 A1 4/2013
(Continued)

OTHER PUBLICATIONS

Microsoft Corporation, "Consideration on UE complexity reduction", Oct. 2014, 3GPP TSG-RAN WG1 Meeting #78bis, R1-144246, 4 Pages.*
(Continued)

*Primary Examiner* — Edan Orgad
*Assistant Examiner* — Ivan O Latorre
(74) *Attorney, Agent, or Firm* — Schwabe, Williamson & Wyatt, P.C.

(57) ABSTRACT

Embodiments described herein relate generally to a communication between a user equipment (UE) and an evolved Node B (eNB). An eNB may allocated uplink and downlink regions associated with machine-type communication (MTC) to a UE. The allocation of uplink and downlink regions may be asymmetric. The eNB may identify parameters based on this asymmetric region allocation to avoid resource collision during communication of hybrid automatic repeat request (HARQ) acknowledgement (ACK) or negative acknowledgement (NACK) feedback between the eNB and the UE. Other embodiments may be described and/or claimed.

13 Claims, 9 Drawing Sheets

(51) Int. Cl.
*H04L 1/18* (2006.01)
*H04W 72/04* (2009.01)

(52) U.S. Cl.
CPC .......... *H04L 1/1861* (2013.01); *H04L 1/1864* (2013.01); *H04L 1/1896* (2013.01); *H04W 4/005* (2013.01); *H04W 72/048* (2013.01); *H04W 72/0446* (2013.01); *H04L 5/0044* (2013.01); *H04W 72/046* (2013.01); *H04W 72/0453* (2013.01)

(58) Field of Classification Search
CPC ... H04L 1/1854; H04L 1/1896; H04L 1/1861; H04L 1/1812; H04L 5/0044; H04L 1/1864
See application file for complete search history.

(56) References Cited

U.S. PATENT DOCUMENTS

| | | | | |
|---|---|---|---|---|
| 2009/0274109 A1* | 11/2009 | Zhang | H04L 1/1614 | 370/329 |
| 2010/0115360 A1* | 5/2010 | Seok | H04L 1/1822 | 714/748 |
| 2010/0211845 A1* | 8/2010 | Lee | H04L 1/1854 | 714/749 |
| 2011/0110246 A1* | 5/2011 | Damnjanovic | H04L 1/0028 | 370/252 |
| 2011/0194525 A1* | 8/2011 | Nishio | H04L 1/1854 | 370/329 |
| 2011/0261679 A1* | 10/2011 | Li | H04L 1/1812 | 370/216 |
| 2012/0002578 A1* | 1/2012 | Ji | H04L 1/16 | 370/281 |
| 2012/0014330 A1* | 1/2012 | Damnjanovic | H04L 5/001 | 370/329 |
| 2012/0129522 A1 | 5/2012 | Kim et al. | | |
| 2012/0163276 A1* | 6/2012 | Kim | H04W 4/06 | 370/312 |
| 2013/0034028 A1* | 2/2013 | Chen | H04L 1/1854 | 370/280 |
| 2013/0143502 A1 | 6/2013 | Kazmi et al. | | |
| 2013/0195041 A1* | 8/2013 | Papasakellariou | H04W 72/042 | 370/329 |
| 2013/0201936 A1* | 8/2013 | Chen | H04W 72/04 | 370/329 |
| 2013/0235812 A1* | 9/2013 | Heo | H04L 5/001 | 370/329 |
| 2013/0242882 A1* | 9/2013 | Blankenship | H04W 72/042 | 370/329 |
| 2014/0023022 A1 | 1/2014 | Cheng et al. | | |
| 2014/0031054 A1 | 1/2014 | Zou et al. | | |
| 2014/0036818 A1 | 2/2014 | Koskela et al. | | |
| 2014/0044056 A1 | 2/2014 | Chen et al. | | |
| 2014/0092839 A1* | 4/2014 | Park | H04L 1/1861 | 370/329 |
| 2014/0098761 A1 | 4/2014 | Lee et al. | | |
| 2014/0220970 A1 | 8/2014 | Yang et al. | | |
| 2014/0301329 A1* | 10/2014 | Kim | H04L 1/1861 | 370/329 |
| 2014/0369245 A1* | 12/2014 | Pecen | H04W 52/0212 | 370/311 |
| 2015/0181560 A1* | 6/2015 | Jamadagni | H04B 7/2621 | 370/329 |
| 2015/0334653 A1* | 11/2015 | Ang | H04W 28/0221 | 370/311 |
| 2016/0007350 A1 | 1/2016 | Xiong et al. | | |
| 2016/0037514 A1 | 2/2016 | Xiong et al. | | |
| 2016/0095076 A1 | 3/2016 | Xiong et al. | | |
| 2016/0127106 A1* | 5/2016 | Nogami | H04L 5/0053 | 370/329 |
| 2016/0134403 A1 | 5/2016 | Xiong et al. | | |
| 2016/0174245 A1* | 6/2016 | Guo | H04W 72/12 | 370/280 |
| 2016/0204930 A1* | 7/2016 | Song | H04L 5/1476 | 370/280 |

FOREIGN PATENT DOCUMENTS

| | | |
|---|---|---|
| WO | 2013149390 A1 | 10/2013 |
| WO | 2013174263 A1 | 11/2013 |
| WO | 2014109684 A1 | 7/2014 |
| WO | 2014113095 A1 | 7/2014 |
| WO | 2016018526 A1 | 2/2016 |
| WO | 2016048519 A1 | 3/2016 |

OTHER PUBLICATIONS

Huawei, HiSilicon, CMCC, "Bandwidth reduction for low cost MTC UE and text proposal", Feb. 2012, 3GPP TSG RAN WG1#68, R1-120051, 9 pages.*
International Search Report and Written Opinion dated Jan. 8, 2016 for International Application No. PCT/US2015/054089; 17 pages.
3GPP, "Evolved Universal Terrestrial Radio Access (E-UTRA); Physical layer procedures (Release 12)," 3GPP TS 36.213 V12.3.0 (Sep. 2014), Sep. 26, 2014, Lte Advanced, 212 pages.
International Search Report and Written Opinion for International Application No. PCT/US2015/036706 dated Jun. 19, 2015; 12 pages.
International Search Report and Written Opinion for International Application No. PCT/US2015/046548 dated Dec. 28, 2015; 14 pages.
International Search Report and Written Opinion for International Application No. PCT/US2015/034958 dated Sep. 22, 2015; 13 pages.
ZTE; "SIB Coverage Improvement for MTC UEs," 3GPP TSG RAN WG1 Meeting #76, R1-140281, Agenda Item: 7.2.2.2.1; Prague, Czech Republic, Feb. 10-14, 2014; 5 pages.
Media Tek Inc.; "On the need of PDCCH for SIB, RAR and Paging," 3GPP TSG-RAN WG1 #76, R1-140239, Agenda Item: 7.2.2.2.3; Prague, Czech Republic, Feb. 10-14, 2014; 4 pages.
Intel Corporation; "Remaining issues for low cost MTC UE," 3GPP TSG-RAN WG1 #77, R1-142024, Agenda item: 6.2.2.1; Seoul, Korea, May 19-23, 2014; 7 pages.
Huawei, Hisilicon; "Discussion on the resource allocation for low cost MTC UEs," 3GPP TSG RAN WG1 Meeting #76bis, R1-141119, Agenda Item: 7.2.2.1; Shenzhen, China, Mar. 31-Apr. 4, 2014; 3 pages.
Ericsson, NSN; "On Reduced UE Bandwidth and Enhanced Coverage for MTC," 3GPP TSG-RAN WG1 Meeting #77, R1-142541, Agenda item: 6.2.2.3; Seoul, Korea, May 19-23, 2014; 2 pages.
3GPP TR 36.888 V2.1.1 (Jun. 2013); "Technical Specification Group Radio Access Network; Study on provision of low-cost MTC UEs based on LTE (Release 12)," Jun. 20, 2013; 55 pages.
International Search Report and Written Opinion for International Application No. PCT/US2015/054318 dated Jan. 4, 2016; 13 pages.
United States Patent and Trademark Office; Office Action for U.S. Appl. No. 14/711,701 dated Oct. 6, 2016; 19 pages.
United States Patent and Trademark Office; Office Action for U.S. Appl. No. 14/711,701 dated Mar. 31, 2017; 16 pages.
United States Patent and Trademark Office; Office Action for U.S. Appl. No. 14/693,653 dated Aug. 11, 2016; 27 pages.
United States Patent and Trademark Office; Office Action for U.S. Appl. No. 14/693,653 dated Apr. 12, 2017; 24 pages.
3GPP TS 36.211 V11.6.0 (Sep. 2014); "Technical Specification Group Radio Access Network; Evolved Universal Terrestrial Radio Access (E-UTRA); Physical channels and modulation (Release 11)," 120 pages.
United States Patent Office; Notice of Allowance dated Jul. 3, 2017 for U.S. Appl. No. 14/711,701; 8 pages.
3GPP TS 36.212 V12.0.0 (Dec. 2013); "Technical Specification Group Radio Access Network; Evolved Universal Terrestrial Radio Access (E-UTRA); Multiplexing and channel coding (Release 12)," 88 pages.

(56) References Cited

OTHER PUBLICATIONS

3GPP TS 36.331 V12.1.0 (Mar. 2014); "Technical Specification Group Radio Access Network; Evolved Universal Terrestrial Radio Access (E-UTRA); Radio Resource Control (RRC); Protocol specification (Release 12)," 356 pages.

3GPP TS 36.211 V12.1.0 (Mar. 2014); "Technical Specification Group Radio Access Network; Evolved Universal Terrestrial Radio Access (E-UTRA); Physical channels and modulation (Release 12)," 120 pages.

Ericsson; "New WI proposal: Further LTE Physical Layer Enhancements for MTC," 3GPP TSG RAN Meeting #65 RP-141660, Agenda Item: 14.1.1; Edinburgh, Scotland, Sep. 9-12, 2014; 9 pages.

\* cited by examiner

SYSTEM AND METHOD TO ADDRESS RESOURCE COLLISION FOR ASYMMETRIC REGION ALLOCATION

CROSS REFERENCE TO RELATED APPLICATIONS

This application claims priority under 35 U.S.C. §119(e) to U.S. Provisional Patent Application No. 62/074,296, entitled "On Handling PUCCH and PHICH Resource Collision for Asymmetric MTC Region Pairs" and filed Nov. 3, 2014. The disclosure of this provisional application is incorporated herein by reference.

FIELD

Embodiments of the present invention relate generally to the technical field of data processing, and more particularly, to computer devices operable to communicate data over a network.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by their inclusion in this section.

Machine-type communication (MTC) is a technology that may enable ubiquitous computing environments towards the concept of the "Internet of Things" (IoT). Potential MTC-based applications include smart metering, healthcare monitoring, remote security surveillance, intelligent transportation systems, and so forth. These services and applications may stimulate the design and development of a new type of MTC device that may be seamlessly integrated into current and future generation mobile broadband networks.

Existing mobile broadband networks are designed to optimize performance mainly for human-type communications. Therefore, existing networks may not be adapted or optimized for MTC-related requirements. MTC-specific designs may be explored, for example, by the 3rd Generation Partnership Project (3GPP). Future 3GPP specifications may support different network design, which may improve MTC-type communication.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they may mean at least one.

DETAILED DESCRIPTION

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" means (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "module" and/or "logic" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, circuitry may be implemented in, or functions associated with the circuitry may be implemented by, one or more software or firmware modules.

Figure 1:
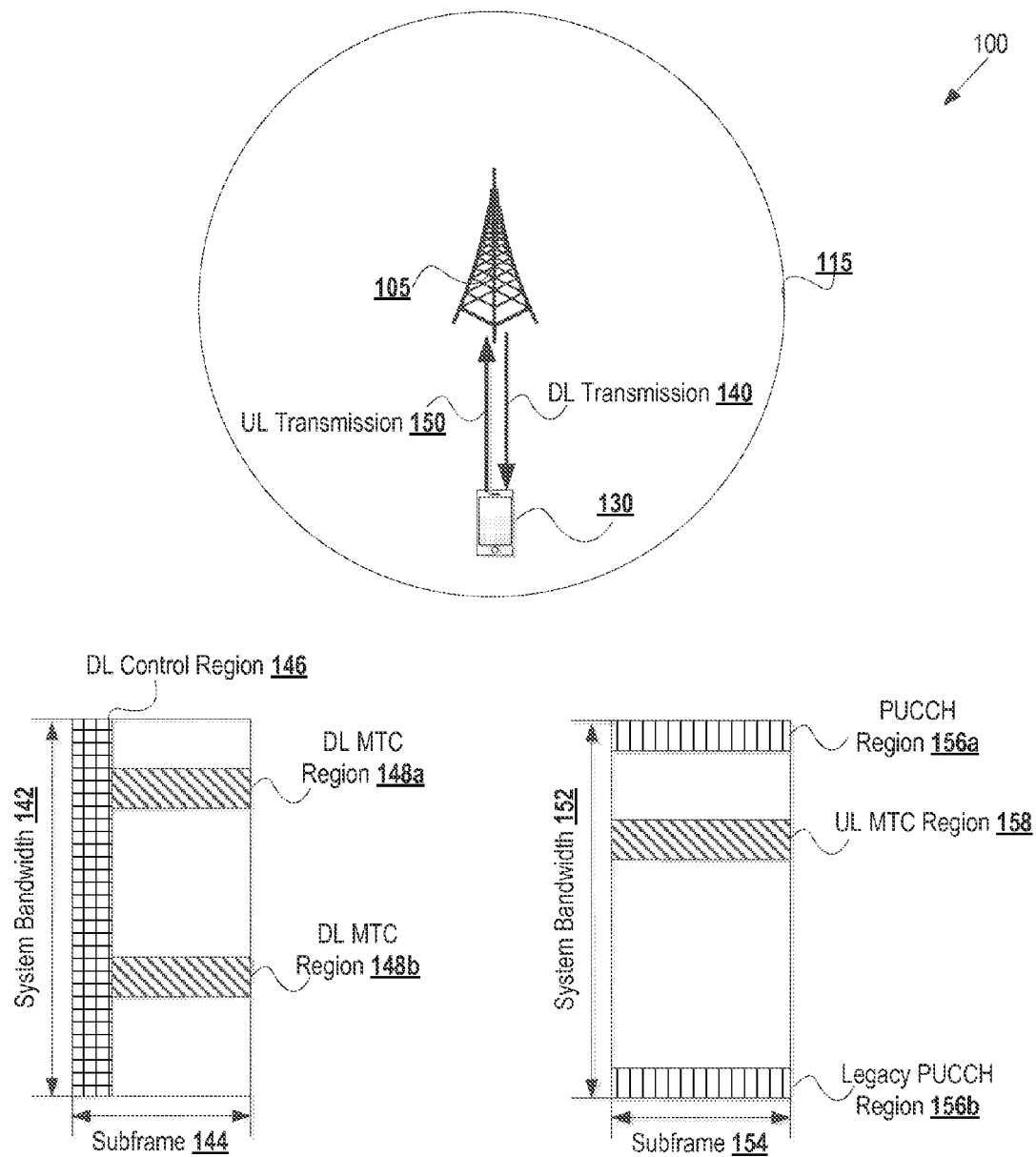
FIG. 1 is a block diagram showing an environment in which an evolved Node B (eNB) may allocate fewer uplink MTC regions than downlink MTC regions for communication with a user equipment (UE), in accordance with various embodiments

Beginning first with FIG. 1, a block diagram shows an environment 100 in which an evolved Node B (eNB) 105 may allocate a greater number of downlink MTC regions than uplink MTC regions for communication with a user equipment (UE) 130, in accordance with various embodiments. The UE 130 may be any type of computing device equipped with broadband circuitry and adapted to operate on a cell (e.g., the cell 115) according to, for example, one or more 3GPP technical specifications. In embodiments, the UE 130 may be adapted for MTC. For example, the UE 130 may be a computing device that is not primarily adapted for user communications (e.g., voice calling, text/instant messaging, web browsing), such as a smart metering device, payment device (e.g., a "pay-as-you-drive" device), a vending machine, a telematics system (e.g., a system adapted for tracking and tracing of vehicles), a security system (e.g., a surveillance device), and the like.

According to embodiments, the UE 130 may be configured for intersystem communication by operating on at least one wireless cell 115. The wireless cell 115 may be provided by the eNB 105.

The eNB 105 may act as a mobility anchors toward a core network (not shown). The eNB 105 may connect the UE 130 to a core network, for example, as part of a third Generation (3G), fourth Generation (4G), fifth Generation (5G), or beyond system that adheres to one or more standards, such as Long Term Evolution (LTE), LTE-Advanced (LTE-A), or other similar standard.

In some embodiments, the transmission bandwidth for communication by the eNB 105 with the UE 130 may be different, for example, so that MTC-type transmissions (e.g., downlink transmission 140, uplink transmission 150, etc.) may conserve cost and/or power. Accordingly, the transmission bandwidth for both control and data channels may be different. In one embodiment, bandwidth for MTC-type transmissions may be greater than 1.4 megahertz (MHz).

With transmission bandwidth and/or where the UE 130 is in an enhanced coverage mode, a single MTC region, which may be a region of a communication frame dedicated to MTC traffic, may be insufficient. Further, the number of MTC regions may be independently configured in the uplink and the downlink (e.g., to accommodate various uplink and/or downlink traffic requirements associated with various deployment scenarios or applications).

In the illustrated embodiment, a plurality of downlink MTC regions 148a-b may be scheduled in a downlink transmission 140. The plurality of downlink MTC regions 148a-b may be transmitted within a system bandwidth 142 (e.g., an increased system bandwidth) in the frequency domain and one subframe 144 in the time domain. Within this system bandwidth 142 and subframe 144, a downlink control region 146 may also be scheduled.

Uplink transmission 150 from the UE 130 to the eNB 105 may include fewer uplink MTC regions 158 than there are downlink MTC regions 148a-b in the downlink transmission 140. Although the illustrated embodiment shows only two downlink MTC regions 148a-b and one uplink MTC region 158, it is to be understood that various numbers are possible so long as the number of downlink MTC regions exceeds the number of uplink MTC regions.

With asymmetric allocation of downlink MTC regions 148a-b and uplink MTC region 158, certain issues may arise during communication of Hybrid Automatic Repeat Request (HARQ) Acknowledgment (ACK) and/or non-acknowledgement (NACK) feedback, for example, on a physical uplink control channel (PUCCH) (e.g., where the UE 130 is to transmit HARQ ACK/NACK feedback to the eNB 105 based on downlink transmission). For example, the greater number of downlink MTC regions 148a-b than uplink MTC regions 158 may incur PUCCH resource collision when a starting control channel element (CCE) of physical downlink control channel (PDCCH) or enhanced PDCCH (EPDCCH) is the same within the plurality of downlink MTC regions 148a-b (e.g., when the eNB 105 schedules PDCCH for unicast transmission using common search space).

In connection with the asymmetric allocation of MTC regions 148a-b, 158, the eNB 105 may identify one or more parameters associated with one or more resources to be used for communication of HARQ ACK/NACK feedback between the UE 130 and the eNB 105. The eNB 105 may signal one or more of the parameters to the UE 130, for example, using radio resource control (RRC) signaling or broadcast transmission (e.g., in a system information block (SIB) or a master information block (MIB)).

Correspondingly, the UE 130 may be configured to receive the one or more parameters associated with one or more resources to be used for communication of HARQ ACK/NACK feedback between the UE 130 and the eNB 105. Based on the one or more parameters, the UE 130 may be configured to identify the one or more resources to be used for the HARQ ACK/NACK feedback. Thus, in response to data received in a downlink transmission 140 (e.g., data received in one of the downlink MTC regions 148a-b), the UE 130 may cause transmission of HARQ ACK/NACK feedback using the one or more identified resources (e.g., in the uplink transmission 150). The UE 130 may cause transmission of the HARQ ACK/NACK feedback using the identified one or more resources on a PUCCH.

Figure 2:
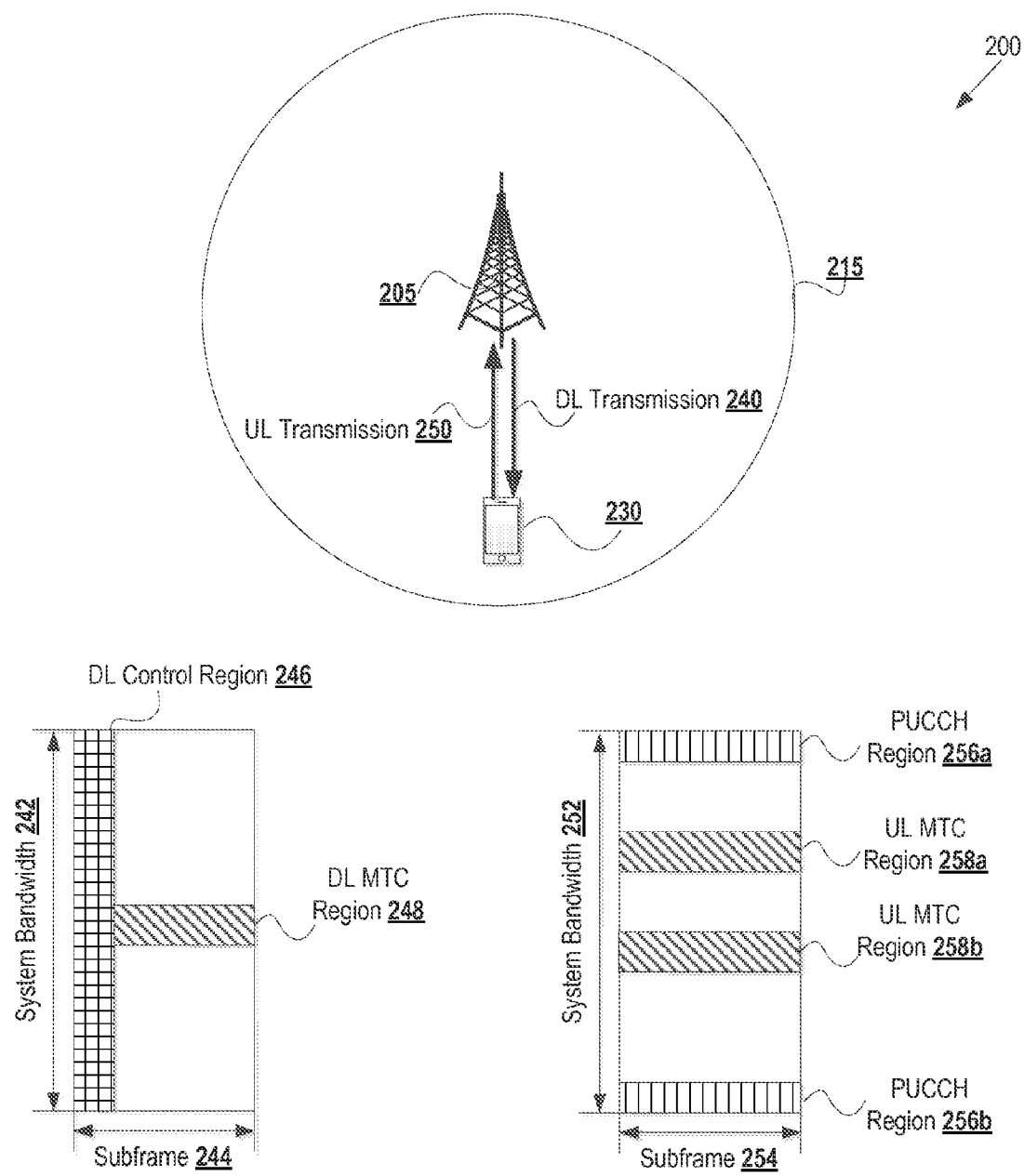
FIG. 2 is a block diagram illustrating an environment in which an eNB may allocate a greater number of uplink MTC regions than downlink MTC regions for communication with a UE, in accordance with various embodiments.

With respect to FIG. 2, a block diagram shows an environment 200 in which an eNB 205 may allocate a greater number of uplink MTC regions than downlink MTC regions for communication with a UE 230, in accordance with various embodiments. The UE 230 may be an embodiment of the UE 130 and/or the eNB 205 may be an embodiment of the eNB 105, as illustrated in FIG. 1.

In the illustrated embodiment, one or more downlink MTC regions 248 may be scheduled in a downlink transmission 240. The one or more downlink MTC regions 248 may be transmitted within a system bandwidth 242 (e.g., an increased system bandwidth) in the frequency domain and one subframe 244 in the time domain. Within this system bandwidth 242 and subframe 244, a downlink control region 246 may also be scheduled.

Uplink transmission 250 from the UE 230 to the eNB 205 may include a greater number of uplink MTC regions 258a-b than there are downlink MTC regions 248 in the downlink transmission 240. The plurality of uplink MTC regions 258a-b may be transmitted within a system bandwidth 252 (e.g., an increased system bandwidth) in the frequency domain and one subframe 254 in the time domain. Within this system bandwidth 252 and subframe 254, a plurality of PUCCH regions 256a-b may also be scheduled.

Although the illustrated embodiment shows only two uplink MTC regions 258a-b and one downlink MTC region 248, it is to be understood that various numbers are possible so long as the number of uplink MTC regions exceeds the number of downlink MTC regions.

With asymmetric allocation of downlink MTC region 248 and uplink MTC regions 258a-b, certain issues may arise during communication of HARQ ACK/NACK feedback, for example, on a physical HARQ indicator channel (PHICH) (e.g., where the eNB 205 is to transmit HARQ ACK/NACK feedback to the UE 230 based on uplink transmission). For example, the greater number of uplink MTC regions 258a-b than downlink MTC regions 248 may incur PHICH resource collision when a physical resource block (PRB) index of physical uplink shared channel transmission (e.g., transmission 250) is the same within a plurality of uplink MTC regions 258a-b, which may occur, e.g., for semi-persistent scheduling.

In connection with the asymmetric allocation of MTC regions 248, 258a-b, the eNB 205 may identify one or more parameters associated with one or more resources to be used for communication of HARQ ACK/NACK feedback between the eNB 205 and the UE 230. The eNB 205 may signal one or more of the parameters to the UE 130, for example, using radio resource control (RRC) signaling or broadcast transmission (e.g., in a system information block (SIB) or a master information block (MIB)). Accordingly, when the eNB 205 receives an uplink transmission 250 from the UE 230, the eNB 205 may be configured to transmit HARQ ACK/NACK feedback to the UE 230 at the one or more resources of a PHICH.

Correspondingly, the UE 230 may be configured to receive the one or more parameters associated with one or more resources to be used for communication of HARQ ACK/NACK feedback between the eNB 205 and the UE 230. Based on the one or more parameters, the UE 230 may be configured to identify the one or more resources to be used for the HARQ ACK/NACK feedback. Thus, in response to data transmitted in an uplink transmission 250 (e.g., data received in one of the uplink MTC regions 258a-b), the UE 230 may be configured to detect HARQ ACK/NACK feedback at resources (e.g., in the downlink transmission 240 from eNB 205) identified from the one or more parameters. The UE 230 may detect the HARQ ACK/NACK feedback at the identified one or more resources on a PHICH.

Figure 3:
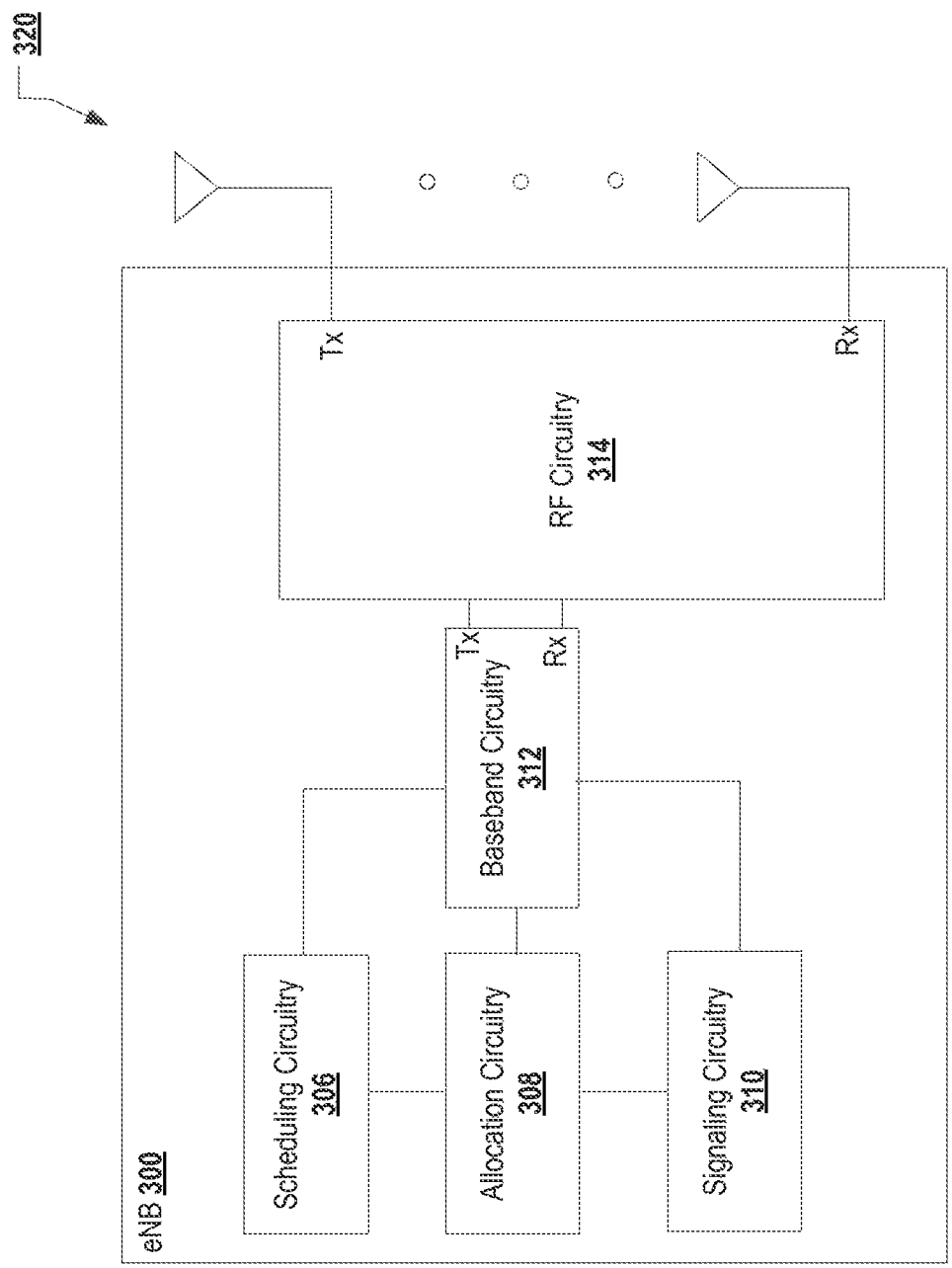
FIG. 3 is a block diagram of an eNB configured to identify parameters associated with communication of hybrid automatic repeat request (HARQ) acknowledgement (ACK) or negative acknowledgement (NACK) feedback between a UE and the eNB, in accordance with various embodiments.

Turning to FIG. 3, a block diagram illustrates an eNB 300 configured to identify parameters associated with communication of HARQ ACK/NACK feedback between a UE and the eNB 300, in accordance with various embodiments. In various embodiments, the eNB 300 may be an embodiment of the eNB 105 of FIG. 1 and/or the eNB 205 of FIG. 2. The eNB 300 may include, among other components, scheduling circuitry 306, allocation circuitry 308, signaling circuitry 310, baseband circuitry 312, and radio frequency (RF) circuitry 314, coupled together at least as shown. In some embodiments, one or more of the circuitries 306, 308, 310, 312, 314 may be integrated together, for example, in a system on a chip (SoC) or other integrated circuit. For example, in some embodiments the scheduling circuitry 306, allocation circuitry 308, signaling circuitry 310, and baseband circuitry 312 may be integrated together in a baseband chipset.

In various embodiments, the RF circuitry 314 may be coupled with one or more antennas 320 to facilitate over-the-air communication of signals to/from the eNB 300. Operations of the RF circuitry 314 may include, but are not limited to, filtering, amplifying, storing, transforming, and so forth of signals. In the transmit path (Tx), the RF circuitry 314 may comprise a power amplifier and/or upconverter. In the receive path (Rx), the RF circuitry 314 may comprise a low noise amplifier and/or downconverter.

In various embodiments, the baseband circuitry 312 may be configured to provide signals to the RF circuitry 314 for transmission over the air. Operations of the baseband circuitry 312 may include, but are not limited to, scrambling, multiplexing, coding, and so forth of signals. In the transmit path (Tx), the baseband circuitry 312 may be configured to perform coding and modulating of signals. In the receive path (Rx), may be configured to perform decoding and demodulating of signals.

The baseband circuitry 312 may include or be communicatively coupled with allocation circuitry 308. The allocation circuitry 308 may be configured to allocate, to a UE (not shown), one or more downlink regions associated with MTC. Further the allocation circuitry 308 may be configured to allocate, to the UE, one or more uplink regions associated with MTC. The allocation of the uplink and downlink regions associated with MTC may allow uplink and downlink communication between the eNB 300 and the UE, for example, so that the eNB 300 and the UE are aware of scheduling and/or bandwidth information for detection of data in various resource elements.

In one embodiment, the allocation circuitry 308 may include or be communicatively coupled with scheduling circuitry 306. In association with the allocation of uplink and downlink regions associated with MTC, the scheduling circuitry 306 may be configured to determine that the one or more uplink regions are fewer in number than the one or more downlink regions. Based on this determination, the scheduling circuitry 306 may be configured to identify one or more parameters associated with one or more resources to be used for communication of HARQ ACK/NACK feedback between the eNB 300 and the UE. The one or more parameters associated with the one or more resources may prevent resource collision on a PUCCH when the UE communicates HARQ ACK/NACK feedback to the eNB 300 in response to data communicated to the UE over the air. Accordingly, the scheduling circuitry 306 may be configured to detect reception of HARQ ACK/NACK feedback from the UE, for example, at the one or more resources of the PUCCH.

In one embodiment, the scheduling circuitry 306 may cause transmission of the one or more parameters to the UE using RRC signaling. In another embodiment, the scheduling circuitry 306 may cause transmission of the one or more parameters to the UE using broadcast transmission. For example, the scheduling circuitry 306 may cause the one or more parameters to be included in an SIB or an MIB.

Where there is symmetric allocation of uplink MTC and downlink MTC regions, a PUCCH resources index for HARQ ACK/NACK feedback may be identified as a function of a first CCE in a physical downlink control channel (PDCCH) used to schedule the downlink transmission to the UE. In particular, a PUCCH resource index for HARQ ACK/NACK feedback may be identified for a physical downlink shared channel (PDSCH) transmission indicated by the detection of a corresponding PDCCH in subframe n-4, or for a PDCCH indicating downlink semi-persistent scheduling (SPS) in subframe n-4, the UE may use $n_{PUCCH}^{(1,\tilde{p}_0)} = n_{CCE} + N_{PUCCH}^{(1)}$ for antenna port $p_0$, where $n_{CCE}$ is the number of the first CCE (e.g., lowest CCE index used to construct the PDCCH) used for transmission of the corresponding downlink control information (DCI) assignment and $N_{PUCCH}^{(1)}$ may configured by higher layers. For two antenna port transmission the PUCCH resource for antenna port $p_1$ is given by $n_{PUCCH}^{(1,\tilde{p}_0)} = n_{CCE} + 1 + N_{PUCCH}^{(1)}$.

In many embodiments, the UE with which the eNB 300 is to communicate may only include a single transmission antenna (e.g., where the UE is a low-cost MTC device). In such embodiments, $n_{PUCCH}^{(1,\tilde{p}_0)} = n_{PUCCH}^{(1)}$ may be sufficient to define one resource for MTC. The scheduling circuitry 306 may identity one or more parameters associated with one or more resources for transmission of HARQ ACK/NACK feedback in association with the asymmetric allocation of uplink and downlink MTC regions.

In one embodiment, the scheduling circuitry 306 may be configured to identify the one or more parameters by configuring an offset value associated with a resource index $n_{PUCCH}^{(1)}$. on the PUCCH (e.g., the channel to be used for communication of HARQ ACK/NACK feedback from the UE to the eNB 300).

In one example of such an embodiment, the scheduling circuitry 306 may be configured to select (e.g., through computation or access from storage) a UE-specific parameter $N_{PUCCH}^{(1)}$. This UE-specific parameter may be signaled to the UE, for example, using UE-specific dedicated RRC signaling. Accordingly, the resource index $n_{PUCCH}^{(1)}$ for HARQ ACK/NACK feedback may be computed as $n_{PUCCH}^{(1)} = n_{CCE} + N_{PUCCH}^{(1)}$.

In another example of such an embodiment, the scheduling circuitry 306 may be configured to select (e.g., through computation or access from storage) an additional parameter $N_{PUCCH}^{(1,M)}$. This additional parameter $N_{PUCCH}^{(1,M)}$ may be UE-specific or may be cell-specific (e.g., specific to a cell provided by the eNB 300). This additional parameter may be signaled to the UE, for example, using UE-specific dedicated RRC signaling or through cell-specific signaling (e.g., in an MIB or SIB). Accordingly, the resource index $n_{PUCCH}^{(1)}$ for HARQ ACK/NACK feedback may be computed as $n_{PUCCH}^{(1)} = n_{CCE} + N_{PUCCH}^{(1)} + N_{PUCCH}^{(1,M)}$. Alternatively, the resource index may be computed as $n_{PUCCH}^{(1)} = n_{CCE} + N_{PUCCH}^{(1,M)}$ if the UE-specific parameter is absent or replaced by the additional parameter $N_{PUCCH}^{(1,M)}$.

In another example of such an embodiment, the scheduling circuitry 306 may be configured to select (e.g., through computation or access from storage) a parameter $N_{PUCCH}^{(1)}$ that is specific to an MTC region of a plurality of downlink MTC regions. That is, one or more downlink MTC region-specific parameters may be configured for different downlink MTC regions and those one or more MTC region-specific parameters may be signaled to the UE (e.g., via MIB or SIB or via UE-specific RRC signaling). For example, the resource index $n_{PUCCH}^{(1)}$ for HARQ ACK/NACK feedback associated with an MTC region may be computed using the MTC region-specific parameter as $n_{PUCCH}^{(1)} = n_{CCE} + N_{PUCCH}^{(1)}$.

In another embodiment, the scheduling circuitry 306 may be configured to identify the one or more parameters by determining a region index associated with a first region of the plurality of allocated downlink MTC regions. For example, the resource index $n_{PUCCH}^{(1)}$ for HARQ ACK/NACK feedback may be a function of a determined region index $I_{DL\_MTC\_Region}$. $I_{DL\_MTC\_Region}$ may be equal to $0, 1, \ldots, N_{DL\_MTC\_Region} - 1$, where $N_{DL\_MTC\_Region}$ is equal to the total number of allocated downlink MTC regions. Accordingly, the resource index may be computed as $n_{PUCCH}^{(1)} = f(n_{CCE}, N_{PUCCH}^{(1)}, I_{DL\_MTC\_Region})$ where f is a predetermined function that also takes into account a parameter $N_{PUCCH}^{(1)}$ (e.g., a UE-specific parameter, a cell-specific parameter, and/or an MTC region-specific parameter) and $n_{CCE}$ (e.g., the number of the lowest CCE index used to construct the PDCCH used for transmission of the corresponding DCI assignment).

In an embodiment, the function may be $n_{PUCCH}^{(1)} = n_{CCE} + N_{PUCCH}^{(1)} + c \cdot I_{DL\_MTC\_Region}$, where c is a constant. This constant c may be predefined or may be configured in a cell-specific manner by the scheduling circuitry 306. This constant c may be signaled to the UE by the eNB 300 (e.g., via SIB or MIB or via RRC signaling).

In another embodiment, the function may be $n_{PUCCH}^{(1)} = n_{CCE} + (b \cdot I_{DL\_MTC\_REGION} + 1) \cdot N_{PUCCH}^{(1)}$, where b is a constant. This constant b may be predefined or may be configured in a cell-specific manner by the scheduling circuitry 306. Alternatively, this constant b may be defined based on the bandwidth of MTC regions. This constant b may be signaled to the UE by the eNB 300 (e.g., via SIB or MIB or via RRC signaling).

In another embodiment, the scheduling circuitry 306 may be configured to identify the one or more parameters by configuring a resource index specific to the UE. That is, the one or more parameters may itself be an indication of one or more resources, such as a specific resource index. This indication of one or more resources may not be signaled to the UE by the eNB 300, but may already be stored in the UE and the eNB 300 may have identify a corresponding indication of one or more resources to coordinate with the UE (e.g., the eNB 300 may have the indication of the one or more resources stored therein). Alternatively, the scheduling circuitry 306 may cause transmission of the indication of the one or more resources to the UE (e.g., via SIB or MIB or via RRC signaling).

In another embodiment, the scheduling circuitry 306 may be configured to identify the one or more parameters by scheduling, in association with transmission of data to the UE, unicast transmissions using a narrowband PDCCH outside of the common search space. For example, the scheduling circuitry 306 may identify the one or more parameters to be resources of a narrowband PDCCH outside of the common search space. This identified one or more parameters (e.g., resources outside the common search space) may not be signaled to the UE; rather, unicast transmissions using a narrowband PDCCH outside of the common search space may prevent resource collision during signaling of HARQ ACK/NACK feedback from the UE to the eNB 300.

In another embodiment, the scheduling circuitry 306 may be configured to identify the one or more parameters by scheduling unicast transmission to the UE using the common search space, but having a starting CCE offset $Y_K$ that is defined as a function of an MTC region index. For example, $Y_K = c \cdot I_{DL\_MTC\_REGION}$, is a constant and $I_{DL\_MTC\_Region}$ may be equal to $0, 1, \ldots, N_{DL\_MTC\_Region} - 1$, where $N_{DL\_MTC\_Region}$ is equal to the total number of allocated downlink MTC regions. This constant c may be predefined or may be configured in a cell-specific manner by the scheduling circuitry 306. One or more of the parameters $Y_K$, c, $I_{DL\_MTC\_REGION}$ may be signaled to the UE so that the UE may compute one or more resources associated with HARQ ACK/NACK feedback from the UE to the eNB 300.

In another embodiment, the scheduling circuitry 306 may be configured to identify the one or more parameters by using a continuous CCE index for different downlink MTC regions. For example, a first downlink MTC region may include CCE indexes from 0 to X−1, a second downlink MTC region may include CCE indexes from X to 2X−1, and so forth, where X may be predefined or configured in a cell-specific manner by the scheduling circuitry 306. The continuous CCE indexes for different downlink MTC regions may prevent resource collision because starting CCE indexes for different downlink MTC regions would not be the same. One or more of the parameters (e.g., the parameter X) may be signaled to the UE by the eNB 300 or may be predefined at the UE.

In one embodiment, the allocation circuitry 308 may include or be communicatively coupled with signaling circuitry 310. In association with the allocation of uplink and downlink regions associated with MTC, the signaling circuitry 310 may be configured to determine that the one or more uplink regions are greater in number than the one or more downlink regions. Based on this determination, the signaling circuitry 310 may be configured to identify one or more parameters associated with one or more resources to be used for communication of HARQ ACK/NACK feedback between the eNB 300 and the UE. The one or more parameters associated with the one or more resources may prevent resource collision on a PHICH when the eNB 300 communicates HARQ ACK/NACK feedback to the UE in response to data communicated to the eNB 300 over the air.

In one embodiment, the signaling circuitry 310 may cause transmission of the one or more parameters to the UE using RRC signaling. In another embodiment, the signaling circuitry 310 may cause transmission of the one or more parameters to the UE using broadcast transmission. For example, the signaling circuitry 310 may cause the one or more parameters to be included in an SIB or an MIB.

Where there is symmetric allocation of uplink MTC and downlink MTC regions, a PHICH resources index for HARQ ACK/NACK feedback may be identified as a function of the first resource block upon which the corresponding uplink PUSCH transmission occurred. In addition, the resources used for a particular PHICH further depend on the reference-signal phase rotation (e.g., cyclic shift for demodulation reference signal (DMRS) associated with a PUSCH transmission) signaled as part of an uplink grant. For the semi-persistently scheduled transmission, the reference signal phase rotation is set to zero for the determination of the PHICH resource index. The PHICH resource index on which HARQ ACK/NACK feedback may be located may be identified as the index pair ($n_{PHICH}^{group}$, $n_{PHICH}^{seq}$), where $n_{PHICH}^{group}$ is the PHICH group number and $n_{PHICH}^{seq}$ is the orthogonal sequence index within the group as defined by:

$$n_{PHICH}^{group} = (I_{PRB\_RA} + n_{DMRS}) \bmod N_{PHICH}^{group} + I_{PHICH} N_{PHICH}^{group}$$

$$n_{PHICH}^{seq} = (\lfloor I_{PRB\_RA} + N_{PHICH}^{group} \rfloor + n_{DMRS}) \bmod 2N_{SF}^{PHICH}$$

Where $n_{DMRS}$ is mapped from the cyclic shift for a DMRS field in a most recent PDCCH with uplink DCI format 4 for the transport block(s) associated with the corresponding PUSCH transmission. $n_{DMRS}$ may be set to zero if there is not PDCCH with uplink DCI format for the same transport block, and if the initial PUSCH for the same transport block is semi-persistently scheduled or if the initial PUSCH for the same transport block is scheduled by a random access response grant. And where $N_{SF}^{PHICH}$ is the spreading factor size used for PHCIH modulation. And where $N_{PHICH}^{group}$ is the number of PHICH groups (e.g., as configured by a higher layer). And where $$I_{PHICH} = \begin{cases} 1 \\ 0 \end{cases},$$

with 1 for time division duplexing (TDD) uplink/downlink configuration 0 with PUSCH transmission in subframe n=4 or 9 and 0 otherwise. And where $$I_{PRB\_RA} = \begin{cases} I_{PRB\_RA}^{lowest\_index} \\ I_{PRB\_RA+1}^{lowest\_index} \end{cases},$$

with $I_{PRB\_RA}^{lowest\_index}$ for the first transport block (TB) of a PUSCH with associated PDCCH or for the case of no associated PDCCH when the number of negatively acknowledged TBs is not equal to the number of TBs indicated in the most recent PDCCH associated with the corresponding PUSCH, and with $I_{PRB\_RA+1}^{lowest\_index}$ for a second TB of a PUSCH with associated PDCCH.

Where there is asymmetric allocation of uplink MTC and downlink MTC regions, the signaling circuitry 310 may be configured to identify one or more parameters associated with communication of HARQ ACK/NACK based on a determination that the allocated uplink MTC regions are greater in number than the allocated downlink MTC regions. The one or more parameters may be associated with one or more resources on which HARQ ACK or NACK feedback is to be transmitted from the eNB 300 to a UE in response to data received from the UE. Accordingly, the signaling circuitry 310 may be configured to cause transmission of HARQ ACK/NACK feedback to the UE on one or more resources of a PHICH in association with reception of data from the UE.

In one embodiment, the signaling circuitry 310 may cause transmission of the one or more parameters to the UE using RRC signaling. In another embodiment, the signaling circuitry 310 may cause transmission of the one or more parameters to the UE using broadcast transmission. For example, the signaling circuitry 310 may cause the one or more parameters to be included in an SIB or an MIB.

In one embodiment, the signaling circuitry 310 may identify the one or more parameters as a region index associated with at least one of the one or more uplink regions. The region index may be for an uplink MTC region. In various embodiments, the PHICH resource index on which HARQ ACK/NACK feedback may be located ($n_{PHICH}^{group}$, $n_{PHICH}^{seq}$) may be a function of the uplink MTC region index and, therefore, may be ($n_{PHICH}^{group}$, $n_{PHICH}^{seq}$)=f($I_{PRB\_RA}$, $n_{DMRS}$, $I_{UL\_MTC\_REGION}$), where f is a predefined function that also takes into account $n_{DMRS}$ and $I_{PRB\_RA}$ (which may be the same as defined above for symmetric allocation of uplink and downlink MTC regions) and $I_{UL\_MTC\_Region}$ may be equal to 0, 1, . . . , $N_{UL\_MTC\_Region}-1$, where $N_{UL\_MTC\_Region}$ is equal to the total number of allocated uplink MTC regions. In one example of such an embodiment, the PHICH resource index may be determined by $$N_{PHICH}^{group} = (I_{PRB\_RA} + c \cdot I_{UL\_MTC\_Region} + n_{DMRS}) \bmod N_{PHICH}^{group} + I_{PHICH} N_{PHICH}^{group}$$

$$n_{PHICH}^{seq} = \lfloor (I_{PRB\_RA} + c \cdot I_{UL\_MTC\_Region}) / N_{PHICH}^{group} \rfloor + n_{DMRS}) \bmod 2N_{SF}^{PHICH}$$

And where the constant c may be predefined or may be configured in a cell-specific manner by the signaling circuitry 310. For example, the constant c=6 for MTC with bandwidth of 1.4 MHz or the constant c may be defined based on the bandwidth of an MTC region. One or more of the parameters, $I_{UL\_MTC\_REGION}$, and/or another parameter (e.g., system bandwidth) may be signaled to the UE so that the UE may compute one or more resources associated with HARQ ACK/NACK feedback from the eNB 300 to the UE.

In another embodiment, the signaling circuitry 310 may identify the one or more parameters as a starting, lowest, or first PRB index for a corresponding PUSCH transmission, e.g., the starting PRB is the first physical PRB index within the system bandwidth. In such an embodiment, a UE that is to receive HARQ ACK/NACK feedback from the eNB 300 may need to know the downlink system bandwidth and the starting PRB of the allocated uplink resource (e.g., so that the UE may derive the first PRB index for the corresponding PUSCH transmission). The signaling circuitry 310 may signal one or more parameters (e.g., the starting PRB of the allocated uplink resource the downlink system bandwidth) using dedicated RRC signaling or broadcast transmission (e.g., via an SIB or MIB). In one example, the PHICH resource may be derived as $$I_{PRB\_RA} = \begin{cases} I_{PRB\_RA}^{lowest\_index} \\ I_{PRB\_RA+1}^{lowest\_index} \end{cases},$$

with $I_{PRB\_RA}^{lowest\_index}$ for the first transport block (TB) of a PUSCH with associated PDCCH or for the case of no associated PDCCH when the number of negatively acknowledged TBs is not equal to the number of TBs indicated in the most recent PDCCH associated with the corresponding PUSCH, and with $I_{PRB\_RA+1}^{lowest\_index}$ for a second TB of a PUSCH with associated PDCCH. $I_{PRB\_RA}^{lowest\_index}$ may be the lowest PRB index in the first slot of the corresponding PUSCH transmission. For asymmetric allocation of uplink and downlink MTC regions, $I_{PRB\_RA}^{lowest\_index}$ may be the lowest PRB index within the downlink system bandwidth in the first slot of the corresponding PUSCH transmission.

Figure 4:
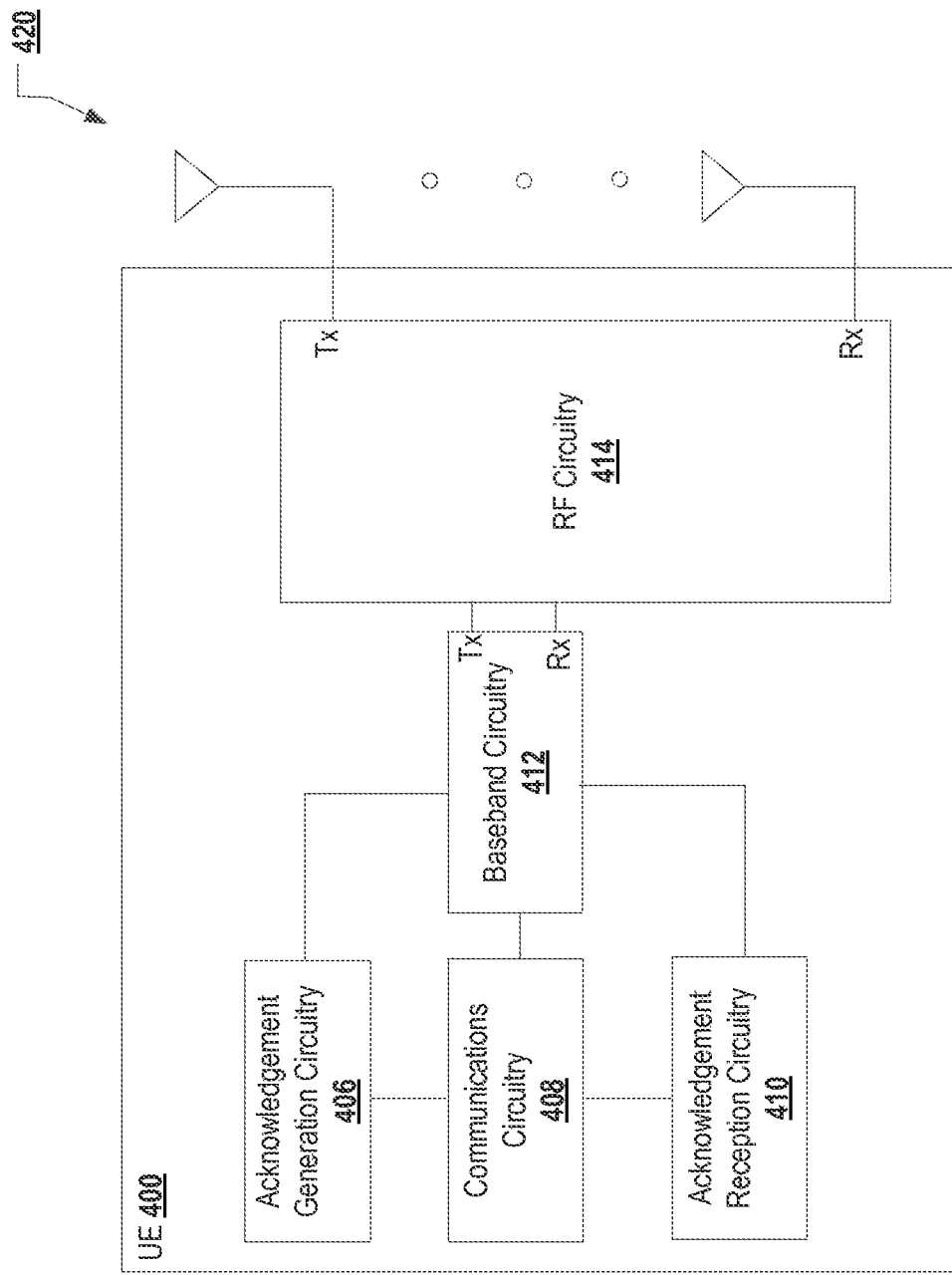
FIG. 4 is a block diagram of a UE configured to identify resources associated with communication of HARQ ACK/NACK feedback between the UE and an eNB, in accordance with various embodiments.

At FIG. 4, a block diagram illustrates UE 400 configured to identify resources associated with communication of HARQ ACK/NACK feedback between the UE 400 and an eNB (not shown). In various embodiments, the UE 400 may be an embodiment of the UE 130 of FIG. 1. and/or the UE 230 of FIG. 2. According to one embodiment, the UE 400 may be an MTC UE. The UE 400 may include, among other components, acknowledgement (ACK) generation circuitry 406, communications circuitry 408, ACK reception circuitry 410, baseband circuitry 412, and radio frequency (RF) circuitry 414, coupled together at least as shown. In some embodiments, one or more of the circuitries 406, 408, 410, 412, 414 may be integrated together, for example, in a system on a chip (SoC) or other integrated circuit. For example, in some embodiments the acknowledgement generation circuitry 406, communications circuitry 408, acknowledgement reception circuitry 410, and baseband circuitry 412 may be integrated together in a baseband chipset.

In various embodiments, the RF circuitry 414 may be coupled with one or more antennas 420 to facilitate over-the-air communication of signals to/from the UE 400. Operations of the RF circuitry 414 may include, but are not limited to, filtering, amplifying, storing, transforming, and so forth of signals. In the transmit path (Tx), the RF circuitry 414 may comprise a power amplifier and/or upconverter. In the receive path (Rx), the RF circuitry 414 may comprise a low noise amplifier and/or downconverter.

In various embodiments, the baseband circuitry 412 may be configured to provide signals to the RF circuitry 414 for transmission over the air. Operations of the baseband circuitry 412 may include, but are not limited to, scrambling, multiplexing, coding, and so forth of signals. In the transmit path (Tx), the baseband circuitry 412 may be configured to perform coding and modulating of signals. In the receive path (Rx), may be configured to perform decoding and demodulating of signals.

The baseband circuitry 412 may include or be communicatively coupled with communications circuitry 408. The communications circuitry 408 may be configured to process allocation information received from an eNB. This allocation information may indicate one or more downlink regions associated with MTC as well as one or more uplink regions associated with MTC. Further, the communications circuitry 408 may be configured to process allocation information that indicates one or more parameters associated with one or more resources to be used for communication of HARQ ACK/NACK feedback between the UE 400 and the eNB. In one embodiment, the one or more parameters may be signaled to the UE 400 using RRC signaling. In another embodiment, the one or more parameters may be signaled to the UE using broadcast transmission (e.g., in an SIB or an MIB).

In one embodiment, the communications circuitry 408 may include or be communicatively coupled with ACK generation circuitry 406. In association with the allocation information, the ACK generation circuitry 306 may be configured to determine that the one or more uplink regions associated with MTC are fewer in number than the one or downlink regions associated with MTC. Based on this determination, the ACK generation circuitry 406 may be configured to identify one or more resources, based on the one or more parameters received from the eNB, to be used on a channel (e.g., PUCCH) for HARQ ACK or NACK feedback to avoid resource collision associated with the allocation of the fewer uplink MTC regions than the downlink MTC regions. Accordingly, the ACK generation circuitry 406 may be configured to cause transmission of HARQ ACK/NACK feedback at the one or more resources of a PUCCH in association with data received from the eNB.

Where there is symmetric allocation of uplink MTC and downlink MTC regions, a PUCCH resources index for HARQ ACK/NACK feedback may be identified as a function of a first CCE in a physical downlink control channel (PDCCH) used to schedule a downlink transmission to the UE 400. In particular, a PUCCH resource index for HARQ ACK/NACK feedback may be identified for a PDSCH transmission indicated by the detection of a corresponding PDCCH in subframe n-4, or for a PDCCH indicating downlink semi-persistent scheduling (SPS) in subframe n-4, the UE may use $n_{PUCCH}^{(1,\tilde{p}_0)} = n_{CCE} + N_{PUCCH}^{(1)}$ for antenna port $p_0$, where $n_{CCE}$ is the number of the first CCE (i.e. lowest CCE index used to construct the PDCCH) used for transmission of the corresponding downlink control information (DCI) assignment and $n_{PUCCH}^{(1)}$ may configured by higher layers. For two antenna port transmission the PUCCH resource for antenna port $p_1$ is given by $n_{PUCCH}^{(1,\tilde{p}0)}=n_{CCE}+1+N_{PUCCH}^{(1)}$.

In many embodiments, the UE 400 may only include a single transmission antenna 420 (e.g., where the UE is a low-cost MTC device). In such embodiments, $n_{PUCCH}^{(1,\tilde{p}0)}=n_{PUCCH}^{(1)}$ may be sufficient to define one resource for MTC. The ACK generation circuitry 406 may identify one or more parameters associated with one or more resources for transmission of HARQ ACK/NACK feedback in association with the asymmetric allocation of uplink and downlink MTC regions.

In one embodiment, the ACK generation circuitry 406 may be configured to identify the one or more resources based on one or more parameter that is/are one or more offset values. Therefore, the ACK generation circuitry 406. In one example of such an embodiment, the offset value may comprise a UE-specific parameter $N_{PUCCH}^{(1)}$. The ACK generation circuitry 406 may be configured to compute the resource index $n_{PUCCH}^{(1)}$ for HARQ ACK/NACK feedback as $n_{PUCCH}^{(1)}=n_{CCE}+N_{PUCCH}^{(1)}$.

In another example of such an embodiment, the ACK generation circuitry 406 may be configured to use another or additional offset $N_{PUCCHC}^{(1,M)}$. This additional offset $N_{PUCCH}^{(1,M)}$ may be UE-specific or may be cell-specific (e.g., specific to a cell provided by the eNB on which the UE 400 is to operate). This other parameter may be signaled to the UE 400, for example, using UE-specific dedicated RRC signaling or through cell-specific signaling (e.g., in an MIB or SIB). Accordingly, the ACK generation circuitry 406 may compute the resource index $n_{PUCCH}^{(1)}$ for HARQ ACK/NACK feedback as $n_{PUCCH}^{(1)}=n_{CCE}+N_{PUCCH}^{(1)}+N_{PUCCH}^{(1,M)}$. Alternatively, the ACK generation circuitry 406 may compute the resource index as $n_{PUCCH}^{(1)}=n_{CCE}+N_{PUCCH}^{(1,M)}$ if the UE-specific parameter is absent or replaced by the additional parameter $N_{PUCCH}^{(1,M)}$.

In another example of such an embodiment, the ACK generation circuitry 406 may be configured to process an offset parameter $N_{PUCCH}^{(1)}$ that is specific to an MTC region of a plurality of downlink MTC regions. That is, one or more downlink MTC region-specific parameters may be configured for different downlink MTC regions and those one or more MTC region-specific parameters may be detected by the ACK generation circuitry 406. The ACK generation circuitry 406 may be configured to compute the resource index $n_{PUCCH}^{(1)}$ for HARQ ACK/NACK feedback associated with an MTC region using the MTC region-specific parameter as $n_{PUCCH}^{(1)}=n_{CCE}+N_{PUCCH}^{(1)}$.

In another embodiment, the one or more parameters may comprise a region index associated with a first region of the plurality of allocated downlink MTC regions detected by the communications circuitry 408. For example, the ACK generation circuitry 406 may be configured to compute the resource index $n_{PUCCH}^{(1)}$ for HARQ ACK/NACK feedback using a function of a determined region index $I_{DL\_MTC\_Region} \cdot I_{DL\_MTC\_Region}$ may be equal to 0, 1, . . . , $N_{DL\_MTC\_Region}-1$, where $N_{DL\_MTC\_Region}$ is equal to the total number of allocated downlink MTC regions. Accordingly, the ACK generation circuitry 406 may compute the resource index as $n_{PUCCH}^{(1)}=f(n_{CCE}, N_{PUCCH}^{(1)}, I_{DL\_MTC\_Region})$ where f is a predetermined function that also takes into account a parameter $N_{PUCCH}^{(1)}$ (e.g., a UE-specific parameter, a cell-specific parameter, and/or an MTC region-specific parameter) and $n_{CCE}$ (e.g., the number of the lowest CCE index used to construct the PDCCH used for transmission of the corresponding DCI assignment).

In an embodiment, the function may be $n_{PUCCH}^{(1)}=n_{CCE}+N_{PUCCH}^{(1)}+c \cdot I_{DL\_MTC\_Region}$, where c is a constant. This constant c may be predefined or may be included in the allocation information as one of the parameters (e.g., the constant c may be specific to a cell operated on by the UE 400).

In another embodiment, the function may be $n_{PUCCH}^{(1)}=n_{CCE}+(b \cdot I_{DL\_MTC\_REGION}+1) \cdot N_{PUCCH}^{(1)}$, where b is a constant. This constant c may be predefined or may be included in the allocation information as one of the parameters (e.g., the constant c may be specific to a cell operated on by the UE 400). Alternatively, this constant b may be defined based on the bandwidth of MTC regions (e.g., bandwidth of 1.4 MHz or greater). This constant b may be signaled to the UE 400 as one of the parameters.

In another embodiment, the one or more parameters may comprise a resource index specific to the UE 400. That is, the one or more parameters may itself be an indication of one or more resources. The ACK generation circuitry 406 may identify the one or more resources based on the one or more parameters by inclusion of the HARQ ACK or NACK feedback in a resource corresponding to the resource index.

In another embodiment, the unicast transmissions using a narrowband PDCCH outside of the common search space may be detected by the ACK generation circuitry 406. Unicast transmissions using a narrowband PDCCH outside of the common search space may avoid resource collision during signaling of HARQ ACK/NACK feedback by the ACK generation circuitry 406 to the eNB.

In another embodiment, the a unicast transmission to the UE 400 may use the common search space, but having a starting CCE offset $Y_K$ that is defined as a function of an MTC region index. For example, $Y_K=c \cdot I_{DL\_MTC\_REGION}$, c is a constant and $I_{DL\_MTC\_Region}$ may be equal to 0, 1, . . . , $N_{DL\_MTC\_Region}-1$, where $N_{DL\_MTC\_Region}$ is equal to the total number of allocated downlink MTC regions. This constant c may be predefined or may be configured in a cell-specific manner. One or more of the parameters $Y_K$, c, $I_{DL\_MTC\_REGION}$ may processed by the communications circuitry 408 and/or ACK generation circuitry 406 so that the UE 400 may compute one or more resources associated with HARQ ACK/NACK feedback from the UE 400 to the eNB.

In another embodiment, the one or more parameters may be based on a continuous CCE index for different downlink MTC regions. For example, a first downlink MTC region may include CCE indexes from 0 to X−1, a second downlink MTC region may include CCE indexes from X to 2X−1, and so forth, where X may be predefined configured in a cell-specific manner. The continuous CCE indexes for different downlink MTC regions may prevent resource collision because starting CCE indexes for different downlink MTC regions would not be the same. One or more of the parameters (e.g., X and/or one or more MTC region indexes) may processed by the communications circuitry 408 and/or ACK generation circuitry 406 so that the UE 400 may compute one or more resources associated with HARQ ACK/NACK feedback from the UE 400 to the eNB.

In one embodiment, the communications circuitry 408 may include or be communicatively coupled with ACK reception circuitry 410. In association with the allocation of uplink and downlink regions associated with MTC, the ACK reception circuitry 410 may be configured to determine that the one or more uplink regions are greater in number than the one or downlink regions. Based on this determination, the ACK reception circuitry 410 may be configured to identify one or more parameters associated with one or more resources to be used for communication of HARQ ACK/NACK feedback between the UE 400 and the eNB. The one or more parameters associated with the one or more resources may prevent resource collision on a PHICH when the eNB communicates HARQ ACK/NACK feedback to the UE 400 in response to data communicated to the eNB over the air.

Where there is symmetric allocation of uplink MTC and downlink MTC regions, a PHICH resources index for HARQ ACK/NACK feedback may be identified as a function of the first resource block upon which the corresponding uplink PUSCH transmission occurred. In addition, the resources used for a particular PHICH further depend on the reference-signal phase rotation (e.g., cyclic shift for demodulation reference signal (DMRS) associated with a PUSCH transmission) signaled as part of an uplink grant. For the semi-persistently scheduled transmission, the reference signal phase rotation is set to zero for the determination of the PHICH resource index. The PHICH resource index on which HARQ ACK/NACK feedback may be located may be identified as the index pair $(n_{PHICH}^{group}, n_{PHICH}^{seq})$, where $n_{PHICH}^{group}$ is the PHICH group number and $n_{PHICH}^{seq}$ is the orthogonal sequence index within the group as defined by:

$$n_{PHICH}^{group} = (I_{PRB\_RA} + n_{DMRS}) \bmod N_{PHICH}^{group} + I_{PHICH} N_{PHICH}^{group}$$

$$n_{PHICH}^{seq} = (\lfloor I_{PRB\_RA} + N_{PHICH}^{group} \rfloor + n_{DMRS}) \bmod 2N_{SF}^{PHICH}$$

Where $n_{DMRS}$ is mapped from the cyclic shift for a DMRS field in a most recent PDCCH with uplink DCI format 4 for the transport block(s) associated with the corresponding PUSCH transmission. $n_{DMRS}$ may be set to zero if there is not PDCCH with uplink DCI format for the same transport block, and if the initial PUSCH for the same transport block is semi-persistently scheduled or if the initial PUSCH for the same transport block is scheduled by a random access response grant. And where $N_{SF}^{PHICH}$ is the spreading factor size used for PHCIH modulation. And where $N_{PHICH}^{group}$ is the number of PHICH groups (e.g., as configured by a higher layer). And where $$I_{PHICH} = \begin{cases} 1 \\ 0, \end{cases}$$

with 1 for time division duplexing (TDD) uplink/downlink configuration 0 with PUSCH transmission in subframe n=4 or 9 and 0 otherwise. And where $$I_{PRB\_RA} = \begin{cases} I_{PRB\_RA}^{lowest\_index} \\ I_{PRB\_RA+1}^{lowest\_index} \end{cases},$$

with $I_{PRB\_RA}^{lowest\_index}$ for the first transport block (TB) of a PUSCH with associated PDCCH or for the case of no associated PDCCH when the number of negatively acknowledged TBs is not equal to the number of TBs indicated in the most recent PDCCH associated with the corresponding PUSCH, and with $I_{PRB\_RA+1}^{lowest\_index}$ for a second TB of a PUSCH with associated PDCCH.

Where there is asymmetric allocation of uplink MTC and downlink MTC regions, the ACK reception circuitry 410 may be configured to identify one or more resources associated with communication of HARQ ACK/NACK, for example, based on one or more parameters received from the eNB to which the UE 400 is to transmit data and/or based on a determination that the allocated uplink MTC regions are greater in number than the allocated downlink MTC regions.

In embodiments, the UE 400 may transmit data to an eNB (e.g., using the communications circuitry 408 and through the broadband circuitry 412 and RF circuitry 414). Responsively, the eNB may transmit HARQ ACK/NACK feedback to the UE 400. The ACK reception circuitry 410 may identify one or more resources of a PHICH that are to include the ACK/NACK feedback so that the ACK reception circuitry 410 may detect if the data transmitted to the eNB was successfully received thereat.

In one embodiment, the ACK reception circuitry 410 may identify the one or more resources based on one or more parameters that indicate a region index associated with at least one of the one or more uplink regions. The region index may be for an uplink MTC region. In various embodiments, the PHICH resource index on which HARQ ACK/NACK feedback may be located $(n_{PHICH}^{group}, n_{PHICH}^{seq})$ may be a function of the uplink MTC region index and, therefore, may be $(n_{PHICH}^{group}, n_{PHICH}^{seq}) = f(I_{PRB\_RA}, n_{DMRS}, I_{UL\_MTC\_REGION})$, where f is a predefined function that also takes into account $n_{DMRS}$ and $I_{PRB\_RA}$ (which may be the same as defined above for symmetric allocation of uplink and downlink MTC regions) and $I_{UL\_MTC\_Region}$ may be equal to 0, 1, . . . , $N_{UL\_MTC\_Region} - 1$, where $N_{UL\_MTC\_Region}$ is equal to the total number of allocated uplink MTC regions. In one example of such an embodiment, the ACK reception circuitry 410 may compute a PHICH resource index as $$n_{PHICH}^{group} = (I_{PRB\_RA} + c \cdot I_{UL\_MTC\_Region} + n_{DMRS}) \bmod N_{PHICH}^{group} + I_{PHICH} N_{PHICH}^{group}$$

$$n_{PHICH}^{seq} = (\lfloor (I_{PRB\_RA} + c \cdot I_{UL\_MTC\_Region}) / N_{PHICH}^{group} \rfloor + n_{DMRS}) \bmod 2N_{SF}^{PHICH}$$

And where the constant c may be predefined or may be configured in a cell-specific manner. For example, the constant c=6 for MTC with bandwidth of 1.4 MHz or the constant c may be defined based on the bandwidth of an MTC region. One or more of the parameters, $I_{UL\_MTC\_REGION}$, and/or another parameter (e.g., system bandwidth) may be processed by the ACK reception circuitry 410 to compute one or more resources associated with HARQ ACK/NACK feedback from to the UE 400 from the eNB.

In another embodiment, the ACK reception circuitry 410 may identify the one or more parameters as a starting, lowest, or first PRB index for a corresponding PUSCH transmission, e.g., the starting PRB is the first physical PRB index within the system bandwidth. For the UE 400 to detect the HARQ ACK/NACK feedback from the eNB, the ACK reception circuitry 410 may need to know the downlink system bandwidth and the starting PRB of the allocated uplink resource (e.g., so that the ACK reception circuitry 410 may derive the first PRB index for the corresponding PUSCH transmission). The ACK reception circuitry 410 may receive one or more parameters (e.g., the starting PRB of the allocated uplink resource the downlink system bandwidth) using dedicated RRC signaling or broadcast transmission (e.g., via an SIB or MIB). From the one or more parameters, the ACK reception circuitry 410 may derive one or more resources at which HARQ ACK/NACK feedback may be located. In one example, the ACK reception circuitry 410 may compute the PHICH resource as $$I_{PRB\_RA} = \begin{cases} I_{PRB\_RA}^{lowest\_index} \\ I_{PRB\_RA+1}^{lowest\_index} \end{cases},$$

with $I_{PRB\_RA}^{lowest\_index}$ for the first TB of a PUSCH with associated PDCCH or for the case of no associated PDCCH when the number of negatively acknowledged TBs is not equal to the number of TBs indicated in the most recent PDCCH associated with the corresponding PUSCH, and with $I_{PRB\_RA+1}^{lowest\_index}$ for a second TB of a PUSCH with associated PDCCH. $I_{PRB\_RA}^{lowest\_index}$ may be the lowest PRB index in the first slot of the corresponding PUSCH transmission. For asymmetric allocation of uplink and downlink MTC regions, $I_{PRB\_RA}^{loweset\_index}$ may be the lowest PRB index within the downlink system bandwidth in the first slot of the corresponding PUSCH transmission.

Figure 5:
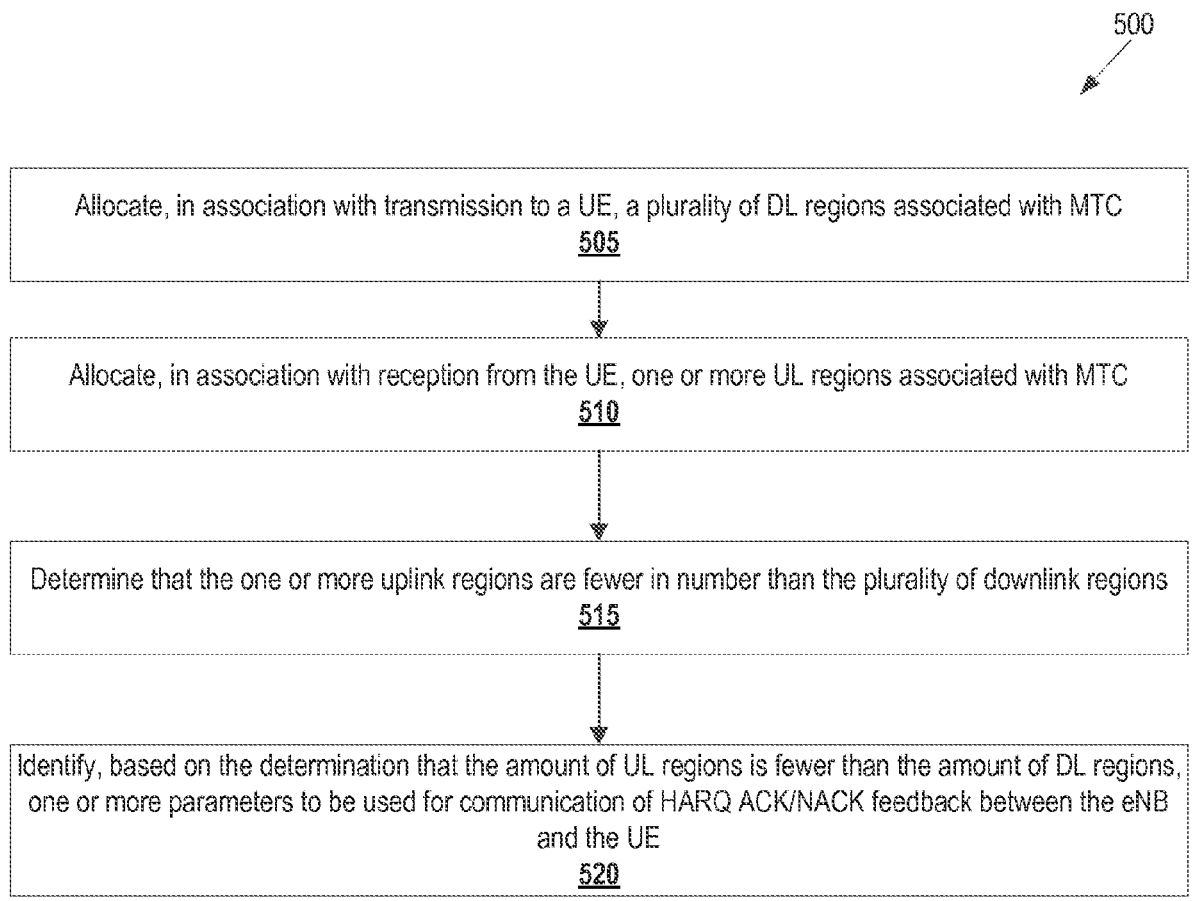
FIG. 5 is a flow diagram illustrating a method for identifying one or more parameters associated with transmission of HARQ ACK/NACK feedback from a UE to an eNB based on asymmetric allocation of MTC regions, in accordance with various embodiments.

With respect to FIG. 5, a flow diagram illustrates a method 500 for identifying one or more parameters associated with transmission of HARQ ACK/NACK feedback from a UE to an eNB based on asymmetric allocation of MTC regions, in accordance with various embodiments. The method 500 may be performed by an eNB, such as the eNB 105 of FIG. 1. While FIG. 5 illustrates a plurality of sequential operations, one of ordinary skill would understand that one or more operations of the method 500 may be transposed and/or performed contemporaneously.

To begin, the method 500 may include an operation 505 for allocating, in association with transmission of data to a UE, a plurality of downlink regions associated with MTC. Similarly, operation 510 may include allocating, in association with reception of data from the UE, one or more uplink regions associated with MTC.

At operation 515, the method 500 may include determining that the one or more uplink regions are fewer in number than the plurality of downlink regions. Thus, there may be asymmetric allocation of regions associated with MTC. This asymmetric allocation may cause resource collision during communication of HARQ ACK/NACK feedback on a PUCCH.

Therefore, operation 520 may include identifying one or more parameters associated with communication of HARQ ACK/NACK feedback between the eNB and the UE. In one embodiment, the one or more parameters may be signaled to the UE so that the UE may compute one or more resources for communication of HARQ ACK/NACK feedback that may prevent resource collision. In another embodiment, the one or more parameters may be associated with resources the eNB is to use to prevent resource collision when the UE transmits HARQ ACK/NACK feedback to the eNB in response to data transmit to the UE from the eNB (e.g., the eNB may avoid using the common search space when scheduling unicast transmissions to the UE).

Figure 6:
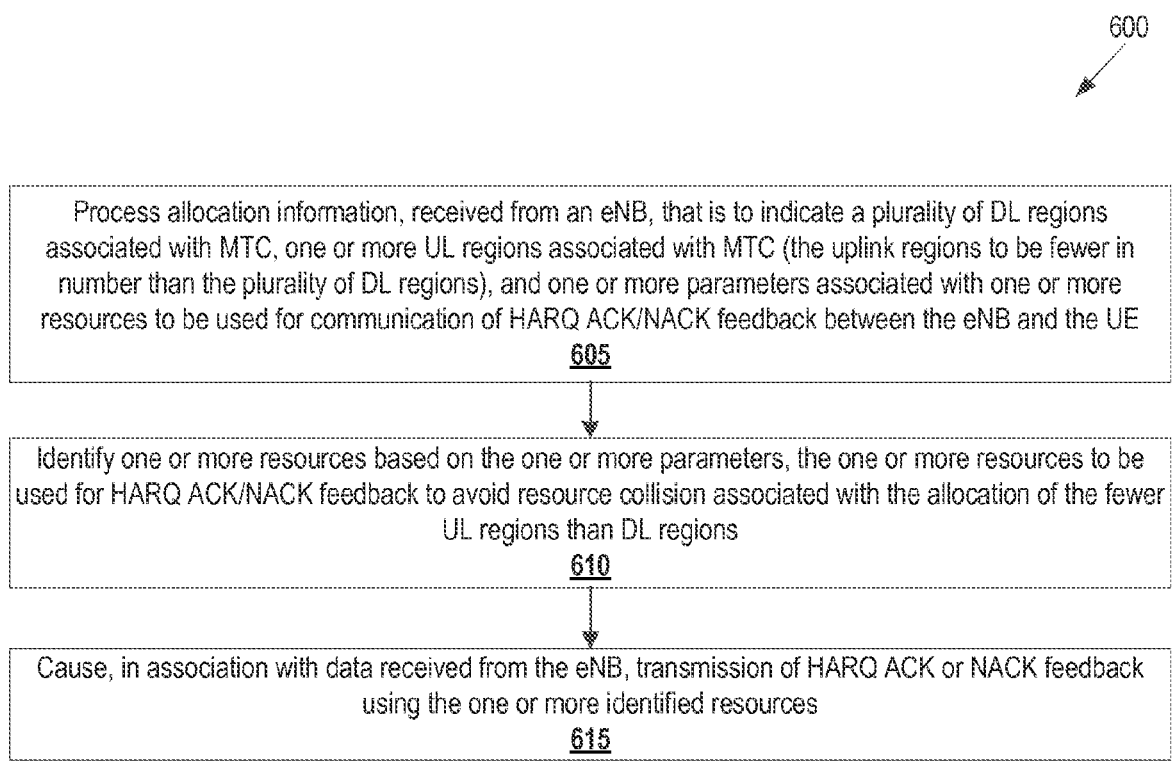
FIG. 6 is a flow diagram illustrating a method for for identifying one or more resources to be used for transmission of HARQ ACK/NACK feedback from a UE to an eNB based on asymmetric allocation of MTC regions, in accordance with various embodiments.

With respect to FIG. 6, a flow diagram illustrates a method 605 for identifying one or more resources to be used for transmission of HARQ ACK/NACK feedback from a UE to an eNB based on asymmetric allocation of MTC regions, in accordance with various embodiments. The method 600 may be performed by a UE, such as the UE 130 of FIG. 1. While FIG. 6 illustrates a plurality of sequential operations, one of ordinary skill would understand that one or more operations of the method 600 may be transposed and/or performed contemporaneously.

To begin, the method 600 may include an operation 600 for processing allocation information received from an eNB. The allocation information may comprise one or more messages that indicate a plurality of downlink regions associated with MTC, as well as one or more uplink regions associated with MTC. The one or more uplink regions may be fewer in the number than the plurality of downlink regions. The allocation information may further comprise one or more parameters associated with one or more resources to be used for communication of HARQ ACK/NACK feedback between the eNB and the UE.

At operation 610, the method 600 may include identifying one or more resources based on the one or more parameters. The one or more resources may be used for communication of HARQ ACK/NACK feedback from the UE to the eNB to avoid resource collision associated with the allocation of the fewer uplink regions than downlink regions. In one embodiment, operation 610 may include operations associated with computing the one or more resources, for example, based on a predetermined function.

Operation 615 may comprise causing, in association with data received from the eNB, transmission of HARQ ACK/NACK feedback using the one or more identified resources. In various embodiments, the one or more identified resources may be of a PUCCH.

Figure 7:
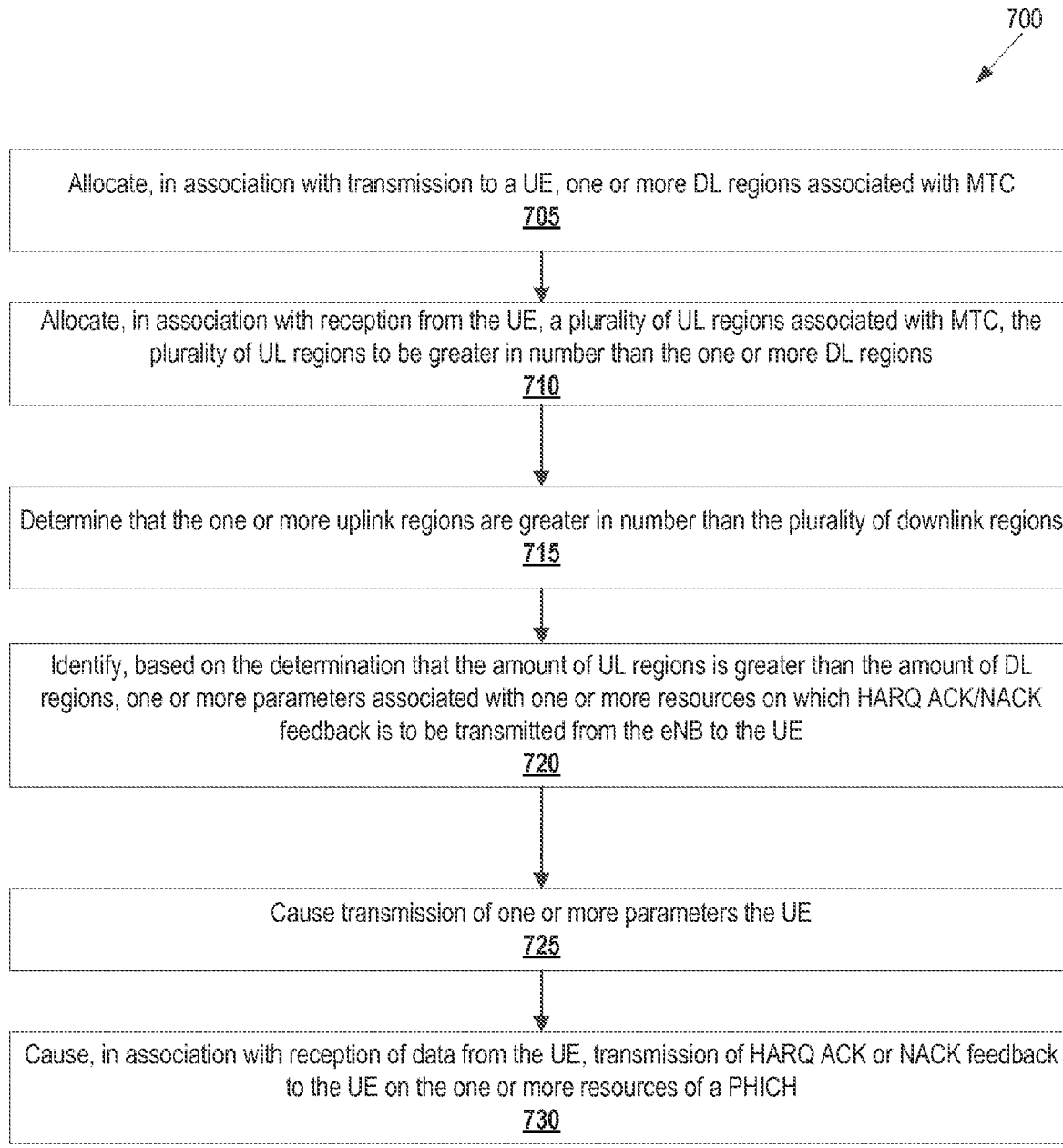
FIG. 7 is a flow diagram illustrating a method for identifying one or more resources to be used for transmission of HARQ ACK/NACK feedback from an eNB to a UE based on asymmetric allocation of MTC regions, in accordance with various embodiments.

With respect to FIG. 7, a flow diagram illustrates a method 700 for identifying one or more resources to be used for transmission of HARQ ACK/NACK feedback from an eNB to a UE based on asymmetric allocation of MTC regions, in accordance with various embodiments. The method 700 may be performed by an eNB, such as the eNB 205 of FIG. 2. While FIG. 7 illustrates a plurality of sequential operations, one of ordinary skill would understand that one or more operations of the method 700 may be transposed and/or performed contemporaneously.

To begin, the method 700 may include an operation 705 for allocating, in association with transmission of data to a UE, one or more downlink regions associated with MTC. Similarly, operation 710 may include allocating, in association with reception of data from the UE, a plurality of uplink regions associated with MTC.

At operation 715, the method 700 may include determining that the plurality of uplink regions are greater in number than the one or more downlink regions. Thus, there may be asymmetric allocation of regions associated with MTC. This asymmetric allocation may cause resource collision during communication of HARQ ACK/NACK feedback on a PHICH.

Therefore, operation 720 may include identifying one or more parameters associated with one or more one or more resources to be used for communication of HARQ ACK/NACK feedback from the eNB to the UE. In one embodiment, operation 720 may comprise operations associated with computing the one or more resources based on the one or more parameters for avoidance of resource collision.

At operation 725, the method 700 may include causing transmission of the one or more parameters to the UE. In various embodiments, the UE may be configured to compute, based on the one or more parameters, one or more resources at which HARQ ACK/NACK feedback is to be located. Operation 730 may comprise causing, in association with reception of data from the UE, transmission of HARQ ACK/NACK feedback to the UE on the one or more resources of a PHICH.

Figure 8:
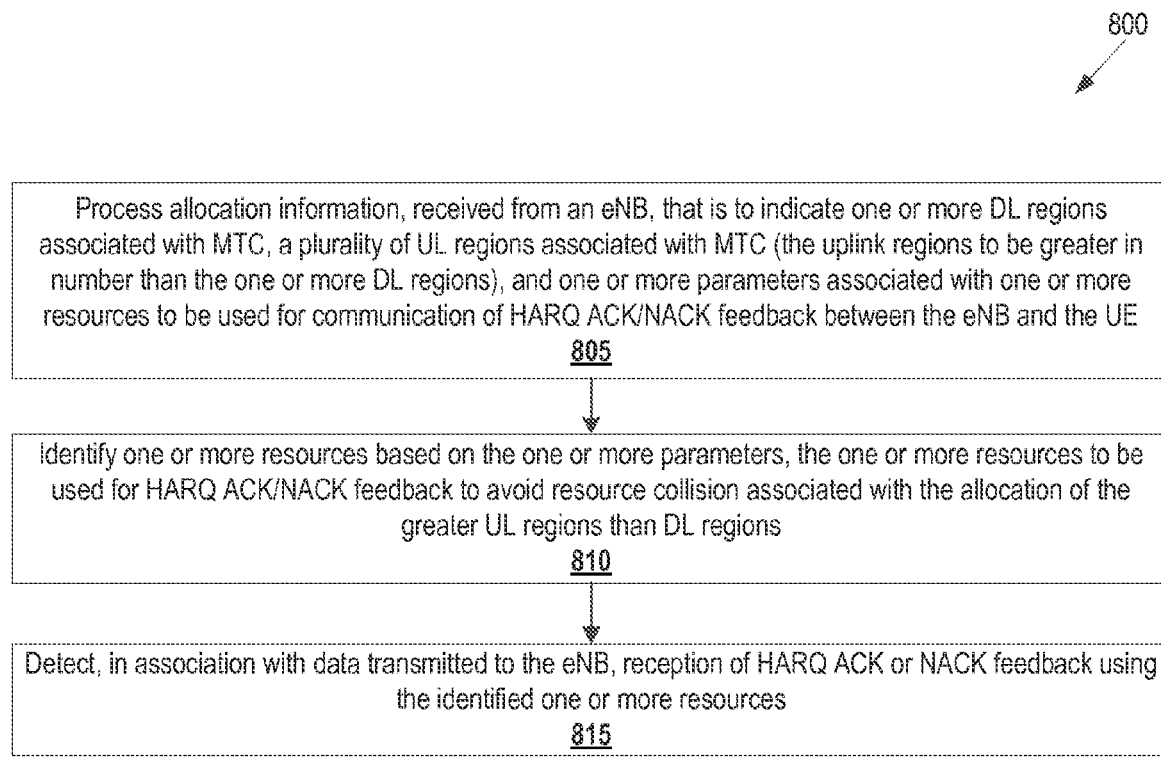
FIG. 8 is a flow diagram illustrating a method for detecting HARQ ACK/NACK feedback from an eNB based on information received from the eNB in association with asymmetric allocation of MTC regions, in accordance with various embodiments.

Turning to FIG. 8, a flow diagram illustrates a method 800 for detecting HARQ ACK/NACK feedback from an eNB based on information received from the eNB in association with asymmetric allocation of MTC regions, in accordance with various embodiments. The method 800 may be performed by a UE, such as the UE 230 of FIG. 2. While FIG.

8 illustrates a plurality of sequential operations, one of ordinary skill would understand that one or more operations of the method 800 may be transposed and/or performed contemporaneously.

To begin, the method 800 may include an operation 805 for processing allocation information received from an eNB. The allocation information may comprise one or more messages that indicate one or more downlink regions associated with MTC, as well as a plurality of uplink regions associated with MTC. The plurality of uplink regions may be greater in the number than the one or more downlink regions. The allocation information may further comprise one or more parameters associated with one or more resources to be used for communication of HARQ ACK/NACK feedback between the eNB and the UE.

At operation 810, the method 800 may include identifying one or more resources based on the one or more parameters. The one or more resources may be used for communication of HARQ ACK/NACK feedback from the eNB to the UE to avoid resource collision associated with the allocation of the greater number of uplink regions than downlink regions. In one embodiment, operation 810 may include operations associated with computing the one or more resources, for example, based on a predetermined function.

Operation 815 may comprise detecting, in association with data transmitted from the UE to the eNB, HARQ ACK/NACK feedback at the one or more identified resources. In various embodiments, the one or more identified resources may be of a PHICH.

Figure 9:
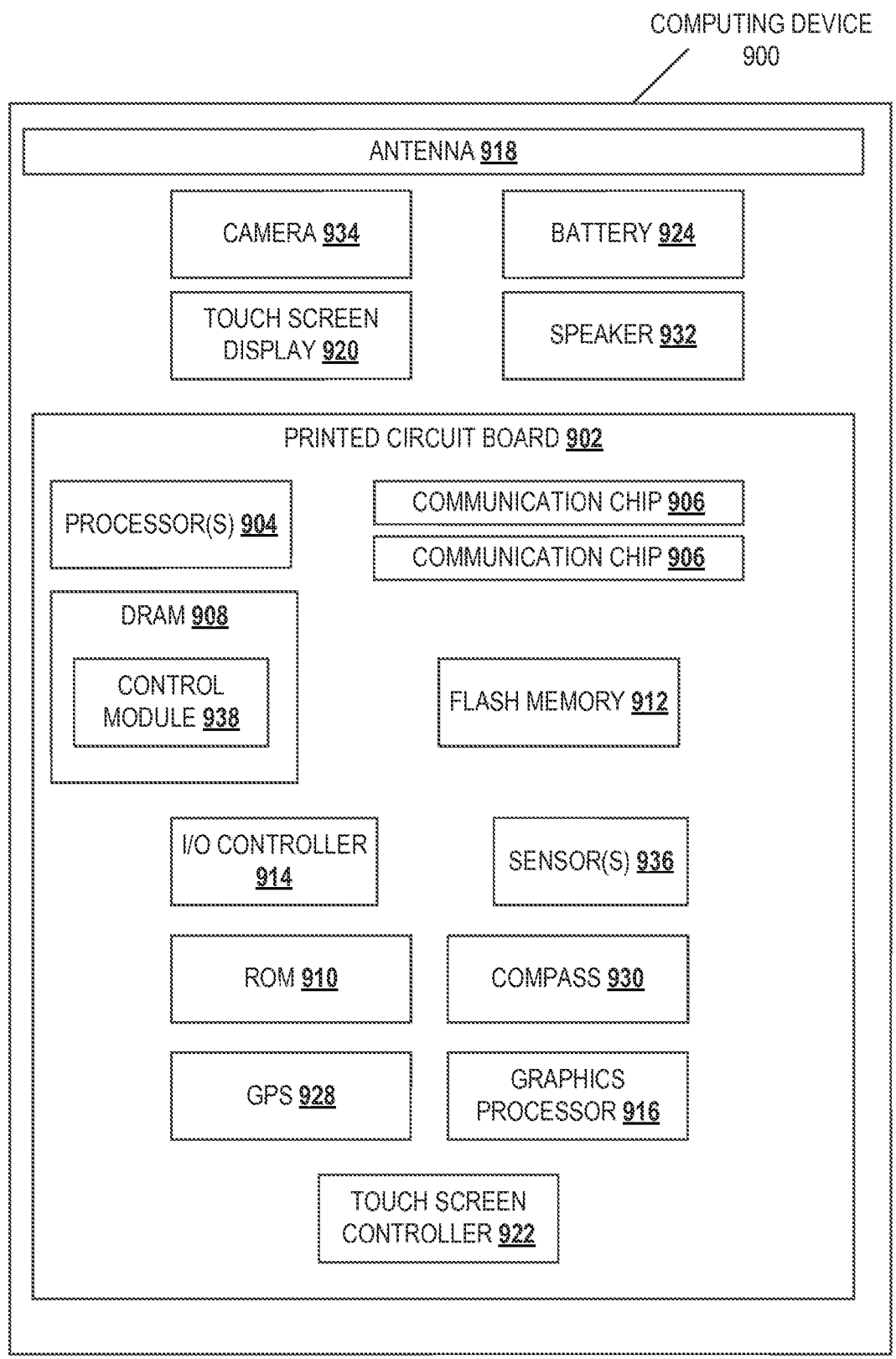
FIG. 9 is a block diagram illustrating a computing device adapted to operate in a wireless communication network, in accordance with various embodiments.

Now with reference to FIG. 9, a block diagram illustrates an example computing device 1100, in accordance with various embodiments. An eNB 105, 205, 300 and/or a UE 130, 230, 400 of FIGS. 1, 2, 3, and/or 4 and described herein may be implemented on a computing device such as computing device 900. Further, the computing device 900 may be adapted to perform one or more operations of the methods 500-800 described in FIGS. 5-8, respectively. The computing device 900 may include a number of components, one or more processors 904, and one or more communication chips 906. Depending upon the embodiment, one or more of the enumerated components may comprise "circuitry" of the computing device 900, such as processing circuitry, communications circuitry, and the like. In various embodiments, the one or more processor(s) 904 each may be a processor core. In various embodiments, the one or more communication chips 906 may be physically and electrically coupled with the one or more processor(s) 904. In further implementations, the communication chips 906 may be part of the one or more processor(s) 904. In various embodiments, the computing device 900 may include a printed circuit board (PCB) 902. For these embodiments, the one or more processor(s) 904 and communication chip 906 may be disposed thereon. In alternate embodiments, the various components may be coupled without the employment of the PCB 902.

Depending upon its applications, the computing device 900 may include other components that may or may not be physically and electrically coupled with the PCB 902. These other components include, but are not limited to, volatile memory (e.g., dynamic random access memory 908, also referred to as "DRAM), non-volatile memory (e.g., read only memory 910, also referred to as "ROM), flash memory 912, an input/output controller 914, a digital signal processor (not shown), a crypto processor (not shown), a graphics processor 916, one or more antenna(s) 918, a display (not shown), a touch screen display 920, a touch screen controller 922, a battery 924, an audio codec (not shown), a video code (not shown), a global navigation satellite system 928, a compass 930, an accelerometer (not shown), a gyroscope (not shown), a speaker 932, a camera 934, one or more sensors 936 (e.g., a barometer, Geiger counter, thermometer, viscometer, rheometer, altimeter, or other sensor that may be found in various manufacturing environments or used in other applications), a mass storage device (e.g., a hard disk drive, a solid state drive, compact disk and drive, digital versatile disk and drive, etc.) (not shown), and the like. In various embodiments, the one or more processor(s) 904 may be integrated on the same die with other components to form a system on a chip (SOC).

In various embodiments, volatile memory (e.g., DRAM 908), non-volatile memory (e.g., ROM 910), flash memory 912, and the mass storage device (not shown) may include programming instructions configured to enable the computing device 900, in response to the execution by one or more processor(s) 904, to practice all or selected aspects of the data exchanges and methods described herein, depending on the embodiment of the computing device 900 used to implement such data exchanges and methods. More specifically, one or more of the memory components (e.g., DRAM 908, ROM 910, flash memory 912, and the mass storage device) may include temporal and/or persistent copies of instructions that, when executed by one or more processor(s) 904, enable the computing device 900 to operate one or more modules 938 configured to practice all or selected aspects of the data exchanges and method described herein, depending on the embodiment of the computing device 900 used to implement such data exchanges and methods.

The communication chips 906 may enable wired and/or wireless communication for the transfer of data to and from the computing device 900. The term "wireless" and its derivatives may be used to describe circuits, devices, systems, methods, techniques, communication channels, etc., that may communicate data through the use of modulated electromagnetic radiation through a non-solid medium. The term does not imply that the associated devices do not contain any wires, although in some embodiments they might not. The communication chips 906 may implement any of a number of wireless standards or protocols, including but not limited to LTE, LTE-A, Institute of Electrical and Electronics Engineers (IEEE) 702.20, General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data Rates for GSM Evolution (EDGE), Code Division Multiple Access (CDMA), Time Division Multiple Access (TDMA), Digital Enhanced Cordless Telecommunications (DECT), Bluetooth, derivatives thereof, as well as other wireless protocols that are designated as 3G, 4G, 5G, and beyond. The computing device 900 may include a plurality of communication chips 906 adapted to perform different communication functions. For example, a first communication chip 906 may be dedicated to shorter range wireless communications, such as Wi-Fi and Bluetooth, whereas a second communication chip 906 may be dedicated to longer range wireless communications, such as GPS, EDGE, GPRS, CDMA, WiMAX, LTE, LTE-A, Ev-DO, and the like.

Example 1 may be n evolved Node B (eNB) comprising: allocation circuitry to: allocate, in association with transmission to a user equipment (UE), a plurality of downlink regions associated with machine-type communication (MTC); and allocate, in association with reception from the UE, one or more uplink regions associated with MTC; and scheduling circuitry, coupled with the allocation circuitry, the scheduling circuitry to: determine the one or more uplink regions are fewer in number than the plurality of downlink regions; and identify, based on determination that the one or more uplink regions are fewer in number than the one or more downlink regions, one or more parameters associated with one or more resources to be used for communication of hybrid automatic repeat request (HARQ) acknowledgement (ACK) or negative acknowledgement (NACK) feedback between the eNB and the UE. Example 2 may include the eNB of example 1, wherein the communication of the HARQ ACK or NACK feedback comprises communication through a Physical Uplink Control Channel (PUCCH). Example 3 may include the eNB of example 1, wherein the one or more parameters are transmitted to the UE using radio resource control (RRC) signaling. Example 4 may include the eNB of example 1, wherein the one or more parameters are broadcast in a system information block (SIB) or a master information block (MIB). Example 5 may include the eNB of any of examples 1-4, wherein to identify the one or more parameters comprises to configure an offset value associated with a resource index on a channel used for the communication of the HARQ ACK or NACK feedback. Example 6 may include the eNB of example 5, wherein the offset value is specific to the UE, to a cell provided by the eNB, or to a first region of the downlink regions. Example 7 may include the eNB of any of examples 1-4, wherein to identify the one or more parameters comprises to determine a region index associated with a first region of the downlink regions. Example 8 may include the eNB of any of examples 1-4, wherein to identify the one or more parameters comprises to configure a resource index specific to the UE to be used on a channel used for the communication of the HARQ ACK or NACK feedback. Example 9 may include the eNB of any of examples 1-4, wherein to identify the one or more parameters comprises to schedule, in association with the transmission to the UE, unicast transmissions using a narrowband physical downlink control channel (PDCCH) outside of a common search space. Example 10 may include the eNB of any of examples 1-4, wherein to identify the one or more parameters comprises to schedule a unicast transmission to the UE using a common search space having a starting control channel element (CCE) that is based on a predetermined function that takes into account an index associated with a first region of the plurality of downlink regions.

Example 11 may be a user equipment (UE) comprising: communications circuitry to: process allocation information, received from an evolved Node B (eNB), that is to indicate: a plurality of downlink regions associated with machine-type communication (MTC); one or more uplink regions associated with MTC, the uplink regions to be fewer in number than the plurality of downlink regions; and one or more parameters associated with one or more resources to be used for communication of hybrid automatic repeat request (HARQ) acknowledgement (ACK) or negative acknowledgement (NACK) feedback between the eNB and the UE; and acknowledgement generation circuitry, coupled with the communications circuitry, to: identify one or more resources based on the one or more parameters, the one or more resources to be used on a channel for HARQ ACK or NACK feedback to avoid resource collision associated with the allocation of the fewer uplink regions than the downlink regions; and cause, in association with data received from the eNB, transmission of HARQ ACK or NACK feedback using the one or more identified resources. Example 12 may include the UE of example 11, wherein the acknowledgement generation circuitry is to cause transmission of the HARQ ACK or NACK feedback using the one or more resources on a Physical Uplink Control Channel (PUCCH). Example 13 may include the UE of example 11, wherein at least a portion of the allocation information is to be received through radio resource control (RRC) signaling, system information block (SIB), or a master information block (MIB). Example 14 may include the UE of any of examples 11-13, wherein the one or more parameters comprise an offset value, and wherein to identify the one or more resources based on the one or more parameters comprises to compute at least one resource for the HARQ ACK or NACK feedback based on the offset value and a first control channel element (CCE). Example 15 may include the UE of any of examples 11-13, wherein the offset value comprises a value that is specific to the UE, specific to a cell provided by the eNB, or specific to a first region of the downlink regions. Example 16 may include the UE of any of examples 11-13, wherein the one or more parameters comprises a resource index, and wherein to identify the one or more resources based on the one or more parameters comprises to include the HARQ ACK or NACK feedback in a resource corresponding to the resource index. Example 17 may include the UE of any of examples 11-13, wherein the one or more parameters comprises an index associated with a first region of the plurality of downlink regions, and wherein to identify the one or more resources based on the one or more parameters comprises to compute at least one resource for the HARQ ACK or NACK feedback based on a predetermined function that takes into account the index and a first control channel element (CCE).

Example 18 may be an evolved Node B (eNB) comprising: allocation circuitry to: allocate, in association with transmission to a user equipment (UE), one or more downlink regions associated with machine-type communication (MTC); and allocate, in association with reception from the UE, a plurality of uplink regions associated with MTC; and signaling circuitry, coupled with the allocation circuitry, the signaling circuitry to: determine the plurality of uplink regions are greater in number than the one or more downlink regions; identify, based on the determination that the plurality of uplink regions are greater in number than the one or more downlink regions, one or more parameters associated with one or more resources on which hybrid automatic repeat request (HARQ) acknowledgement (ACK) or negative acknowledgement (NACK) feedback is to be transmitted from the eNB to the UE; cause transmission of one or more parameters to the UE; and cause, in association with reception of data from the UE, transmission of HARQ ACK or NACK feedback to the UE on the one or more resources of a physical hybrid automatic repeat request channel (PHICH). Example 19 may include the eNB of example 18, wherein the one or more parameters comprise a region index associated with at least one of the one or more uplink regions, and wherein to cause transmission of the one or more parameters comprises to cause transmission of the region index. Example 20 may include the eNB of example 18, wherein the one or more parameters comprise an indication of a starting physical resource block (PRB) of a physical uplink shared channel (PUSCH) transmission and a downlink system bandwidth. Example 21 may include the eNB of example 20, wherein the downlink system bandwidth is greater than 1.4 megahertz (MHz).

Example 22 may be a user equipment (UE) comprising: communications circuitry to: process allocation information, received from an evolved Node B (eNB), that is to indicate: one or more downlink regions associated with machine-type communication (MTC); a plurality of uplink regions associated with MTC, the plurality of uplink regions to be greater in number than the one or more downlink regions; and one or more parameters associated with one or more resources to be used for communication of hybrid automatic repeat request (HARQ) acknowledgement (ACK) or negative acknowledgement (NACK) feedback between the eNB and the UE; and acknowledgement reception circuitry, coupled with the communications circuitry, to: identify, in association with the allocation of the greater number of uplink regions than the downlink regions, one or more resources based on the one or more parameters, the one or more resources to be used for HARQ ACK or NACK feedback to avoid resource collision associated with the allocation of the greater number of uplink regions than the downlink regions; and detect, in association with data transmitted to the eNB, reception of HARQ ACK or NACK feedback through a physical hybrid automatic repeat request channel (PHICH) using the identified one or more resources. Example 23 may include the UE of example 22, wherein the one or more parameters comprise a region index associated with at least one of the one or more uplink regions, and wherein to identify the one or more resources comprises to compute the one or more resources based on a predetermined function that takes into account the region index. Example 24 may include the UE of example 22, wherein the one or more parameters comprise an indication of a starting physical resource block (PRB) of a physical uplink shared channel (PUSCH) transmission and a downlink system bandwidth, and wherein to identify the one or more resources comprises to derive the one or more resources from the staring PRB and the downlink system bandwidth. Example 25 may include the UE of example 24, wherein the downlink system bandwidth is greater than 1.4 megahertz (MHz).

Example 26 may include a method to be performed in an evolved Node B (eNB), the method comprising: allocating, in association with transmission to a user equipment (UE), one or more downlink regions associated with machine-type communication (MTC); and allocating, in association with reception from the UE, a plurality of uplink regions associated with MTC; determining the plurality of uplink regions are greater in number than the one or more downlink regions; identifying, based on the determination that the plurality of uplink regions are greater in number than the one or more downlink regions, one or more parameters associated with one or more resources on which hybrid automatic repeat request (HARQ) acknowledgement (ACK) or negative acknowledgement (NACK) feedback is to be transmitted from the eNB to the UE; causing transmission of one or more parameters to the UE; and causing, in association with reception of data from the UE, transmission of HARQ ACK or NACK feedback to the UE on the one or more resources of a physical hybrid automatic repeat request channel (PHICH). Example 27 may include the method of example 26, wherein the one or more parameters comprise a region index associated with at least one of the one or more uplink regions, and wherein to cause transmission of the one or more parameters comprises to cause transmission of the region index. Example 28 may include the method of example 26, wherein the one or more parameters comprise an indication of a starting physical resource block (PRB) of a physical uplink shared channel (PUSCH) transmission and a downlink system bandwidth. Example 29 may include the method of example 28, wherein the downlink system bandwidth is greater than 1.4 megahertz (MHz).

Example 30 may be one or more non-transitory computer-readable media comprising computing device-executable instructions, wherein the instructions, in response to execution by a user equipment (UE), cause the UE to: process allocation information, received from an evolved Node B (eNB), that is to indicate: one or more downlink regions associated with machine-type communication (MTC); a plurality of uplink regions associated with MTC, the plurality of uplink regions to be greater in number than the one or more downlink regions; and one or more parameters associated with one or more resources to be used for communication of hybrid automatic repeat request (HARQ) acknowledgement (ACK) or negative acknowledgement (NACK) feedback between the eNB and the UE; and identify, in association with the allocation of the greater number of uplink regions than the downlink regions, one or more resources based on the one or more parameters, the one or more resources to be used for HARQ ACK or NACK feedback to avoid resource collision associated with the allocation of the greater number of uplink regions than the downlink regions; and detect, in association with data transmitted to the eNB, reception of HARQ ACK or NACK feedback through a physical hybrid automatic repeat request channel (PHICH) using the identified one or more resources. Example 31 may include the one or more non-transitory computer-readable media of example 30, wherein the one or more parameters comprise a region index associated with at least one of the one or more uplink regions, and wherein to identify the one or more resources comprises to compute the one or more resources based on a predetermined function that takes into account the region index. Example 32 may include the one or more non-transitory computer-readable media of example 30, wherein the one or more parameters comprise an indication of a starting physical resource block (PRB) of a physical uplink shared channel (PUSCH) transmission and a downlink system bandwidth, and wherein to identify the one or more resources comprises to derive the one or more resources from the staring PRB and the downlink system bandwidth.

Example 33 may be an apparatus comprising: means for allocating, in association with transmission to a user equipment (UE), a plurality of downlink regions associated with machine-type communication (MTC) and for allocating, in association with reception from the UE, one or more uplink regions associated with MTC; means for determining the one or more uplink regions are fewer in number than the plurality of downlink regions; and means for identifying, based on determination that the one or more uplink regions are fewer in number than the one or more downlink regions, one or more parameters associated with one or more resources to be used for communication of hybrid automatic repeat request (HARQ) acknowledgement (ACK) or negative acknowledgement (NACK) feedback between the eNB and the UE. Example 34 may include the apparatus of example 33, wherein the communication of the HARQ ACK or NACK feedback comprises communication through a Physical Uplink Control Channel (PUCCH). Example 35 may include the apparatus of example 33, wherein the one or more parameters are transmitted to the UE using radio resource control (RRC) signaling. Example 36 may include the apparatus of any of examples 33-35, wherein to identify the one or more parameters comprises to configure an offset value associated with a resource index on a channel used for the communication of the HARQ ACK or NACK feedback.

Example 37 may be a method comprising: processing allocation information, received from an evolved Node B (eNB), that is to indicate: a plurality of downlink regions associated with machine-type communication (MTC); one or more uplink regions associated with MTC, the uplink regions to be fewer in number than the plurality of downlink regions; and one or more parameters associated with one or more resources to be used for communication of hybrid automatic repeat request (HARQ) acknowledgement (ACK) or negative acknowledgement (NACK) feedback between the eNB and the UE; identifying one or more resources based on the one or more parameters, the one or more resources to be used on a channel for HARQ ACK or NACK feedback to avoid resource collision associated with the allocation of the fewer uplink regions than the downlink regions; and causing, in association with data received from the eNB, transmission of HARQ ACK or NACK feedback using the one or more identified resources. Example 38 may include the method of example 37, wherein the acknowledgement generation circuitry is to cause transmission of the HARQ ACK or NACK feedback using the one or more resources on a Physical Uplink Control Channel (PUCCH). Example 39 may include the method of any of examples 37-38, wherein the offset value comprises a value that is specific to the UE, specific to a cell provided by the eNB, or specific to a first region of the downlink regions. Example 40 may include the method of any of examples 37-38, wherein the one or more parameters comprises a resource index, and wherein to identify the one or more resources based on the one or more parameters comprises to include the HARQ ACK or NACK feedback in a resource corresponding to the resource index.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the arts. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Embodiments of the invention also relate to an apparatus for performing the operations herein. Such a computer program is stored in a non-transitory computer-readable medium. A machine-readable medium includes any mechanism for storing information in a form readable by a machine (e.g., a computer). For example, a machine-readable (e.g., computer-readable) medium includes a machine- (e.g., a computer-) readable storage medium (e.g., read only memory (ROM), random access memory (RAM), magnetic disk storage media, optical storage media, flash memory devices).

The processes or methods depicted in the preceding figures can be performed by processing logic that comprises hardware (e.g., circuitry, dedicated logic, etc.), software (e.g., embodied on a non-transitory computer-readable medium), or a combination of both. Although the processes or methods are described above in terms of some sequential operations, it should be appreciated that some of the operations described can be performed in a different order. Moreover, some operations can be performed in parallel rather than sequentially. Embodiments of the present invention are not described with reference to any particular programming language. It will be appreciated that a variety of programming languages can be used to implement the teachings of embodiments of the invention as described herein. In the foregoing Specification, embodiments of the invention have been described with reference to specific exemplary embodiments thereof. It will be evident that various modifications can be made thereto without departing from the broader spirit and scope of the invention as set forth in the following claims. The Specification and drawings are, accordingly, to be regarded in an illustrative sense rather than a restrictive sense.

What is claimed is:

1. An evolved Node B (eNB) comprising:
   allocation circuitry to:
      allocate, in association with transmission to a user equipment (UE), a plurality of downlink machine-type communication (MTC) regions; and
      allocate, in association with reception from the UE, one or more uplink MTC regions, wherein the plurality of downlink MTC regions and the one or more uplink MTC regions are separated by frequency; and
   scheduling circuitry, coupled with the allocation circuitry, the scheduling circuitry to:
      determine the one or more uplink MTC regions are fewer in number than the plurality of downlink MTC regions;
      identify, based on the determination that the one or more uplink MTC regions are fewer in number than the plurality of downlink MTC regions, one or more parameters associated with one or more resources to be used for communication of hybrid automatic repeat request (HARQ) acknowledgement (ACK) or negative acknowledgement (NACK) feedback between the eNB and the UE, wherein the one or more parameters includes a region index associated with a first region of the downlink MTC regions, and wherein a resource index for the HARQ ACK or NACK feedback is a function of the region index; and
      cause transmission of the one or more parameters to the UE,
   wherein a bandwidth for MTC-type transmissions is greater than 1.4 MHz.

2. The eNB of claim 1, wherein the communication of the HARQ ACK or NACK feedback comprises communication through a Physical Uplink Control Channel (PUCCH).

3. The eNB of claim 1, wherein the one or more parameters are transmitted to the UE using radio resource control (RRC) signaling.

4. The eNB of claim 1, wherein the one or more parameters are broadcast in a system information block (SIB) or a master information block (MIB).

5. The eNB of claim 1, wherein to identify the one or more parameters comprises to configure a resource index specific to the UE to be used on a channel used for the communication of the HARQ ACK or NACK feedback.

6. The eNB of claim 1, wherein to identify the one or more parameters comprises to schedule, in association with the transmission to the UE, unicast transmissions using a narrowband physical downlink control channel (PDCCH) outside of a common search space.

7. The eNB of claim 1, wherein to identify the one or more parameters comprises to schedule a unicast transmission to the UE using a common search space having a starting control channel element (CCE) that is based on a predetermined function that takes into account an index associated with a first region of the plurality of downlink MTC regions.

8. A user equipment (UE) comprising:
communications circuitry to:
process allocation information, received from an evolved Node B (eNB), that is to indicate:
a plurality of downlink machine-type communication (MTC) regions;
one or more uplink MTC regions, the uplink MTC regions to be fewer in number than the plurality of downlink MTC regions, wherein the plurality of downlink MTC regions and the one or more uplink MTC regions are separated by frequency; and
one or more parameters associated with one or more resources to be used for communication of hybrid automatic repeat request (HARQ) acknowledgement (ACK) or negative acknowledgement (NACK) feedback between the eNB and the UE; and
acknowledgement generation circuitry, coupled with the communications circuitry, to:
identify one or more resources based on the one or more parameters, the one or more resources to be used on a channel for the HARQ ACK or NACK feedback to avoid resource collision associated with allocation of the fewer uplink MTC regions than the downlink MTC regions, wherein the one or more parameters includes a region index associated with a first region of the plurality of downlink MTC regions, and wherein to identify the one or more resources based on the one or more parameters includes to compute at least one resource for the HARQ ACK or NACK feedback based on a predetermined function that takes into account the region index; and
cause, in association with data received from the eNB, transmission of the HARQ ACK or NACK feedback using the one or more identified resources,
wherein a bandwidth for MTC-type transmissions is greater than 1.4 MHz.

9. The UE of claim 8, wherein the acknowledgement generation circuitry is to cause transmission of the HARQ ACK or NACK feedback using the one or more resources on a Physical Uplink Control Channel (PUCCH).

10. The UE of claim 8, wherein at least a portion of the allocation information received from the eNB is to be received through radio resource control (RRC) signaling, a system information block (SIB), or a master information block (MIB).

11. The UE of claim 8, wherein to compute the at least one resource for the HARQ ACK or NACK feedback based on the predetermined function that takes into account the region index comprises to compute the at least one resource for the HARQ ACK or NACK feedback based on the predetermined function that takes into account the region index and a first control channel element (CCE).

12. One or more non-transitory computer-readable media comprising computing device-executable instructions, wherein the instructions, in response to execution by an evolved Node B (eNB), cause the eNB to:
allocate, in association with transmission to a user equipment (UE), one or more downlink machine-type communication (MTC) regions;
allocate, in association with reception from the UE, a plurality of uplink MTC regions, wherein the one or more downlink MTC regions and the plurality of uplink MTC regions are separated by frequency;
determine the plurality of uplink MTC regions are greater in number than the one or more downlink regions;
identify, based on the determination that the plurality of uplink MTC regions are greater in number than the one or more downlink MTC regions, one or more parameters associated with one or more resources on which hybrid automatic repeat request (HARQ) acknowledgement (ACK) or negative acknowledgement (NACK) feedback is to be transmitted from the eNB to the UE, wherein the one or more parameters includes a region index associated with at least one of the plurality of uplink MTC regions, and wherein a resource index for the HARQ ACK or NACK feedback is a function of the region index;
cause transmission of one or more parameters to the UE; and
cause, in association with reception of data from the UE, transmission of HARQ ACK or NACK feedback to the UE on the one or more resources of a physical hybrid automatic repeat request channel (PHICH),
wherein a system bandwidth for MTC-type transmissions is greater than 1.4 MHz.

13. One or more non-transitory computer-readable media comprising computing device-executable instructions, wherein the instructions, in response to execution by a user equipment (UE), cause the UE to:
process allocation information, received from an evolved Node B (eNB), that is to indicate:
one or more downlink machine-type communication (MTC) regions;
a plurality of uplink MTC regions, the plurality of uplink MTC regions to be greater in number than the one or more downlink MTC regions, wherein the one or more downlink MTC regions and the plurality of uplink MTC regions are separated by frequency; and
one or more parameters associated with one or more resources to be used for communication of hybrid automatic repeat request (HARQ) acknowledgement (ACK) or negative acknowledgement (NACK) feedback between the eNB and the UE;
identify, in association with the allocation of the greater number of uplink MTC regions than the downlink MTC regions, one or more resources based on the one or more parameters, the one or more resources to be used for HARQ ACK or NACK feedback to avoid resource collision associated with the allocation of the greater number of uplink MTC regions than the downlink MTC regions, wherein the one or more parameters includes a region index associated with at least one of the plurality uplink MTC regions, and wherein a resource index for the HARQ ACK or NACK feedback is a function of the region index; and
detect, in association with data transmitted to the eNB, reception of HARQ ACK or NACK feedback through a physical hybrid automatic repeat request channel (PHICH) using the identified one or more resources,
wherein a system bandwidth for MTC-type transmissions is greater than 1.4 MHz.

* * * * *